US009146751B2

(12) United States Patent
Anzures et al.

(10) Patent No.: US 9,146,751 B2
(45) Date of Patent: Sep. 29, 2015

(54) DEVICE, METHOD, AND GRAPHICAL USER INTERFACE FOR NAVIGATION OF MULTIPLE APPLICATIONS

(75) Inventors: Freddy Allen Anzures, San Francisco, CA (US); Alessandro Francesco Sabatelli, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 540 days.

(21) Appl. No.: 12/890,489

(22) Filed: Sep. 24, 2010

(65) Prior Publication Data

US 2011/0252368 A1 Oct. 13, 2011

Related U.S. Application Data

(60) Provisional application No. 61/321,864, filed on Apr. 7, 2010.

(51) Int. Cl.
*G06F 3/048* (2013.01)
*G06F 9/44* (2006.01)
*G06F 3/0488* (2013.01)

(52) U.S. Cl.
CPC .......... *G06F 9/4443* (2013.01); *G06F 3/04883* (2013.01)

(58) Field of Classification Search
CPC ..... H04L 69/24; H04L 67/14; H04L 67/2814; H04L 67/2871; H04L 12/2697; H04L 43/50; H04L 49/90; H04L 69/32; H04L 49/9047; H04L 63/0236; H04L 67/306; H04L 67/42; H04L 12/2602; H04L 12/6418
USPC ........................................................ 715/759
See application file for complete search history.

(56) References Cited

U.S. PATENT DOCUMENTS

| 5,140,678 | A | 8/1992 | Torres |
| 6,215,490 | B1 | 4/2001 | Kaply |
| 6,300,951 | B1 * | 10/2001 | Filetto et al. ................... 715/797 |
| 7,506,260 | B2 * | 3/2009 | Wada et al. ................... 715/738 |
| 8,181,119 | B1 | 5/2012 | Ording |
| 2010/0057576 | A1 | 3/2010 | Brodersen et al. |
| 2010/0115388 | A1 | 5/2010 | Nguyen |
| 2010/0162108 | A1 * | 6/2010 | Stallings et al. .............. 715/702 |

OTHER PUBLICATIONS

David Pogue, Windows Vista for Starters: The Missing Manual (Jan. 25, 2007).*
Ed Baig, Palm Pre: The Missing Manual (Aug. 27, 2009).*

(Continued)

*Primary Examiner* — Amy Ng
*Assistant Examiner* — Di Xiao
(74) *Attorney, Agent, or Firm* — Morrison & Foerster LLP

(57) ABSTRACT

A method a multifunction device with a touch-sensitive display includes: detecting a first user input on a first application icon on the display; in response to detecting the first user input: activating and displaying a first application associated with the first application icon in a first region of the display and displaying a partial view of a second application in a second region of the display without activating the second application; detecting a second user input on the partial view of the second application on the display; in response to detecting the second user input: suspending the first application and activating a full view of the second application on the display; detecting a third user input to deactivate the second application; and, in response to detecting the third user input: deactivating the second application and resuming the first application on the display.

18 Claims, 27 Drawing Sheets

(56) References Cited

OTHER PUBLICATIONS

Chris Ziegler, Palm Pre for Dummies(Aug. 27, 2009).*
*Apple Inc.* vs. *Samsung Electronics Co. Ltd. et al.*, Judgment in Interlocutory proceeding, Case No. 396957/KG ZA 11-730, Civil Law Sector, Aug. 24, 2011, pp. 1-65.
*Apple Inc.* vs. *Samsung Electronics Co. Ltd., et al.*, Samsung's Motion to Supplement Invalidity Contentions, Case No. 11-cv-01846-LHK, filed Jan. 27, 2012 together with Exhibit 6, Jan. 27, 2012, 47 pages.
*Apple Inc.* vs. *Samsung Electronics Co. Ltd., et al.*, Samsung's Patent Local Rule 3-3 and 3-4 Disclosures, Case No. 11-cv-01846-LHK, dated Oct. 7, 2011, together with Exhibits G-1 through G-7 and Exhibit H, Oct. 7, 2011, 287 pages.
HTC Europe Co. Ltd and Apple Inc. Invalidity Claim dated Apr. 5, 2012, together with annexes, 12 pages.
HTC Europe Co. Ltd and Apple Inc. invalidity Claim dated Jul. 29, 2011, together with amended Particulars of Claim and amended Grounds of Invalidity, 22 pages.
Motorola Mobility Opposition Grounds to Apple Inc. European Patent EP 2126678 dated Apr. 11, 2012, together with Exhibits E3, E4, and E5 re: CHT 2005, Apr. 2-7, 2005, Portland Oregon, USA, Apr. 2012, 53 pages.
Pleading notes Mr B.J. Berghuis van Woodman, in matter of *Apple Inc.* vs *Samsung Electronics*, Case No. KG ZA 11-730 and KG ZA 11-731,, Aug. 10-11, 2010, pp. 1-16.
Pleading notes Mr Kleemans, Mr Blomme and Mr Van Oorschot, in matter of *Apple Inc.* vs *Samsung Electronics*, Case No. KG ZA 11-730 and KG ZA 11-731, Aug. 10, 2011, 35 pages.
*Samsung Electronics GmbH* vs *Apple Inc.*, "List scrolling and document translation, scaling and rotation on a touch-screen display", Opposition, Jan. 30, 2012, 27 pages.
*Samsung Electronics* vs *Apple Inc.*, Statement of Defense Also Counterclaim, Case No. KG ZA 2011-730, Jul. 20, 2011, 44 pages.
*Samsung Electronics* vs *Apple Inc.*, Statement of Defense Also Counterclaim, Case No. KG ZA 2011-731, Jul. 20, 2011, 48 pages.
Non-Final Office Action received for U.S. Appl. No. 12/890,499, mailed on Apr. 6, 2015, 14 pages.
Notice of Allowance received for U.S. Appl. No. 12/890,482, mailed on May 8, 2014, 5 pages.
Non-Final Office Action received for U.S. Appl. No. 12/890,499, mailed on Sep. 11, 2014, 11 pages.
AppleInsider, "Quattro purchase, 5000M + iTunes accounts could give Apple ad advantage," appleinsider.com, Jan. 15, 2010, http://www.appleinsider.com/print/10/01/15/quattro_purchase_itunes_accounts_could_give_apple_mobile_ad_advantage.html, 2 pages.
Butcher, D., "Google exec outlines mobile strategy at Mobile Marketing Day," Mobile Commerce Daily, Mar. 5, 2010, http://www.mobilecommercedaily.com/google-exec-reveals-mobile-strategy-case-studies-market-potential/print/, 5 pages.
Chen et al., "Apple Event to Focus on Reinventing Content, Not Tablets," Wired.com, Jan. 27, 2010, http://www.wired.com/epicenter/2010/01/apple-tablet-content/, 10 pages.
Google, "What are Google Gadget Ads?" Google.com, downloaded from the internet Mar. 10, 2010, http://www.google.com/adwords/gadgetads/, 1 page.
Mobility, "iTunes affiliate campaign on MobPartner!", mobility.mobi, Dec. 7, 2009, http://mobility.mobi/showthread.php?45609-iTunes-affiliate-campaign-on-MobPartner-!, 4 pages.
Patel, K., "Apple Sets Out to Reinvent Mobile Ads," Business Insider, Feb. 11, 2010, http://www.businessinsider.com/apple-sets-out-to-reinvent-mobile-ads-2010-01, 5 pages.
Tweney, D., "Apple's Next Revolutionary Product: iTunes," Wired.com, Feb. 1, 2010, http//www.wired.com/epicenter/2010/02/apples-next-revolution/, 7 pages.
YouTube, "How to insert AdMob ads into your iPhone App in Xcode on the iPhone SDK!" 9:16 minute video downloaded from the internet on Mar. 10, 2010, http://www.youtube.com/watch?v,=FebH9EuBBro.
YouTube, "Xcode iPhone SDK Tutorial—Using AdMob Advertising," 4:48 minute video downloaded from YouTube Mar. 10, 2010, http://www.youtube.com/watch?v=_y2j77KT6Tw, 2 pages.
Office Action dated Jul. 5, 2012, received in U.S. Appl. No. 12/890,472, 9 pages (Anzures).
Final Office Acton dated Feb. 6, 2013, received in U.S. Appl. No. 12/890,472, 10 pages (Anzures).
Office Action dated Sep. 27, 2012, received in. U.S. Appl. No. 12/890,482, 11 pages (Anzures).
Final Office Action dated Sep. 12, 2013, received in U.S. Appl. No. 12/890,482, 10 pages (Anzures).
Office Action dated Nov. 26, 2012, reeceived in U.S. Appl. No. 12/890,499, 12 pages (Anzures).
Final Office Action dated Jul. 8, 2013, received in U.S. Appl. No. 12/890,499, 17 pages (Anzures).

* cited by examiner

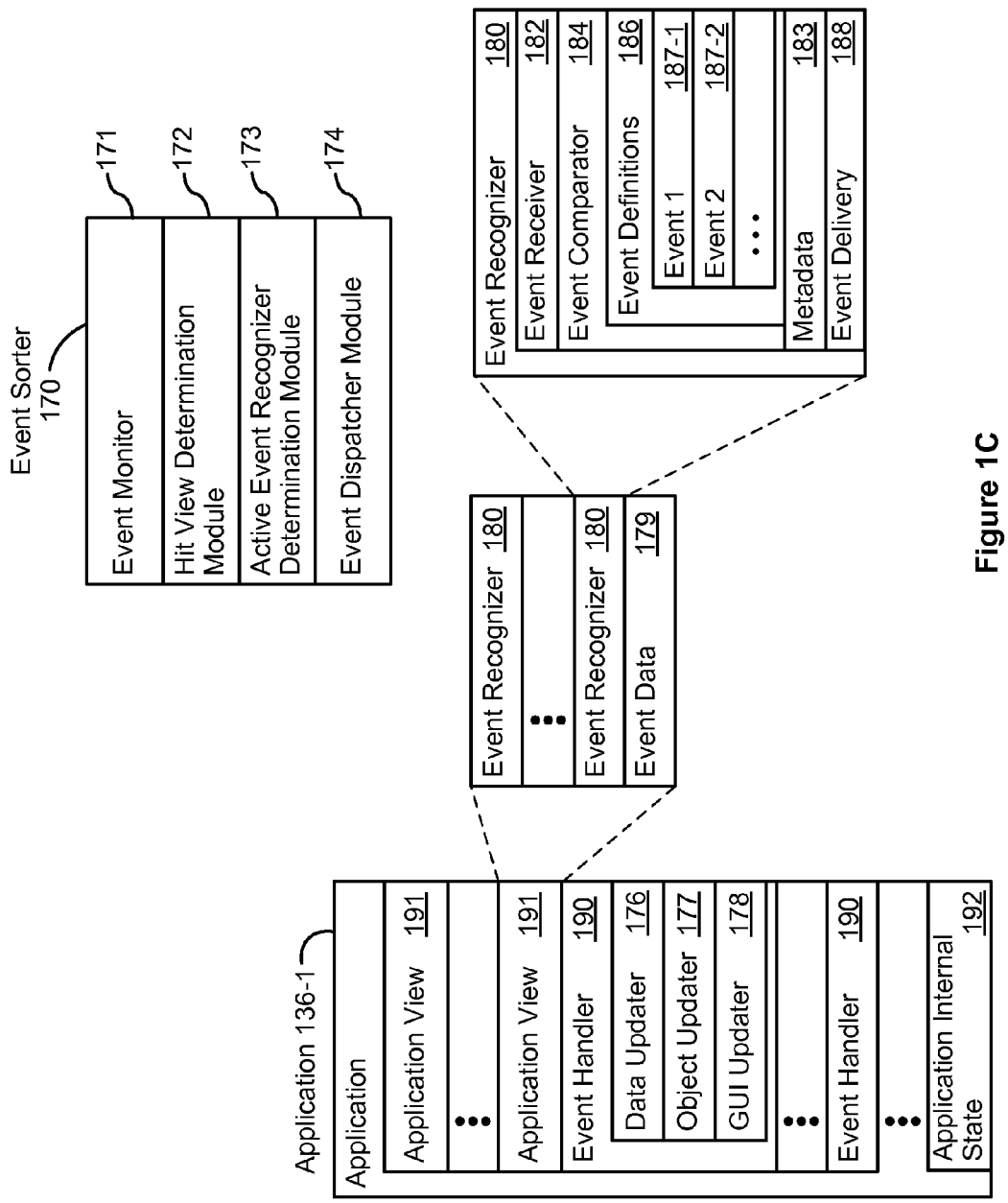

DEVICE, METHOD, AND GRAPHICAL USER INTERFACE FOR NAVIGATION OF MULTIPLE APPLICATIONS

RELATED APPLICATIONS

This application claims priority to U.S. Provisional Application Ser. No. 61/321,864, filed Apr. 7, 2010, which is incorporated herein by reference in its entirety.

This application is related to the following: (1) U.S. application Ser. No. 12/890,472, filed Sep. 24, 2010, entitled "Device, Method, and Graphical User Interface for Navigation of Multiple Applications," (2) U.S. application Ser. No. 12/890,482, filed Sep. 24, 2010, entitled "Device, Method, and Graphical User Interface for Navigation of Multiple Applications,"; and (3) U.S. application Ser. No. 12/890,499, filed Sep. 24, 2010, entitled "Device, Method, and Graphical User Interface for Navigation of Multiple Applications,", which are incorporated herein by reference in their entirety.

TECHNICAL FIELD

The disclosed embodiments relate generally to electronic devices with touch-sensitive surfaces, including but not limited to electronic devices with touch-sensitive surfaces that enable user navigation of multiple applications.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display so as to activate/deactivate applications associated with different user interface objects.

But users often find it cumbersome and inefficient when navigating back and forth between applications using existing methods of manipulating different user interface objects. For example, existing methods do not provide a simple, intuitive way for a user to deactivate or suspend a new application and resume a previous application from which the new application was launched. As a result, existing methods create a significant cognitive burden on a user and reduce the user's willingness to invoke new applications. In addition, existing methods take longer than necessary, thereby wasting energy. This latter consideration is particularly important in battery-operated devices.

SUMMARY

Accordingly, there is a need for computing devices with faster, more efficient methods and interfaces for a user to efficiently navigate back and forth between multiple applications. Such methods and interfaces may complement or replace conventional application navigation methods. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a multifunction device with a display and a touch-sensitive surface. In some embodiments, the display and the touch-sensitive surface are combined together into a touch-sensitive display. The method includes: detecting a first user input on a first application icon on the display; in response to detecting the first user input, activating and displaying a first application associated with the first application icon in a first region of the display; concurrently displaying a partial view of a second application in a second region of the display, distinct from the first region, without activating the second application; detecting a second user input on the partial view of the second application on the display; in response to detecting the second user input: suspending the first application and activating a full view of the second application on the display; detecting a third user input to deactivate the second application; and in response to detecting the third user input: deactivating the second application and resuming the first application on the display.

In accordance with some embodiments, a multifunction device includes a display, a touch-sensitive surface, one or more processors, memory, and one or more programs. The one or more programs are stored in the memory and configured to be executed by the one or more processors. The one or more programs include instructions for: detecting a first user input on a first application icon on the display; in response to detecting the first user input, activating and displaying a first application associated with the first application icon in a first region of the display; concurrently displaying a partial view of a second application in a second region of the display, distinct from the first region, without activating the second application; detecting a second user input on the partial view of the second application on the display; in response to detecting the second user input: suspending the first application and activating a full view of the second application on the display; detecting a third user input to deactivate the second application; and in response to detecting the third user input: deactivating the second application and resuming the first application on the display.

In accordance with some embodiments, a computer readable storage medium has stored therein instructions which when executed by a multifunction device with a display and a touch-sensitive surface, cause the device to: detect a first user input on a first application icon on the display; in response to detecting the first user input, activate and display a first application associated with the first application icon in a first region of the display; concurrently display a partial view of a second application in a second region of the display, distinct from the first region, without activating the second application; detect a second user input on the partial view of the second application on the display; in response to detecting the second user input: suspend the first application and activate a full view of the second application on the display; detect a third user input to deactivate the second application; and, in response to detecting the third user input: deactivate the second application and resume the first application on the display.

In accordance with some embodiments, a graphical user interface on a multifunction device with a display, a touch-sensitive surface, a memory, and one or more processors to execute one or more programs stored in the memory includes a first application associated with a first application icon; a partial view of a second application; and a full view of the second application. In response to detecting a first user input on the first application icon on the display, a first application associated with the first application icon is activated and displayed in a first region of the display; a partial view of a second application is concurrently displayed in a second region of the display, distinct from the first region, without activating the second application. In response to detecting a second user input on the partial view of the second application on the display: the first application is suspended; and a full view of the second application on the display is activated. In response to detecting a third user input to deactivate the second application: the second application is deactivated; and the first application is resumed on the display.

In accordance with some embodiments, a multifunction device includes: a display; a touch-sensitive surface; means for detecting a first user input on a first application icon on the display; in response to detecting the first user input, means for activating and displaying a first application associated with the first application icon in a first region of the display; means for concurrently displaying a partial view of a second application in a second region of the display, distinct from the first region, without activating the second application; means for detecting a second user input on the partial view of the second application on the display; in response to detecting the second user input: means for suspending the first application and means for activating a full view of the second application on the display; means for detecting a third user input to deactivate the second application; and, in response to detecting the third user input: means for deactivating the second application and means for resuming the first application on the display.

In accordance with some embodiments, an information processing apparatus for use in a multifunction device with a display and a touch-sensitive surface includes: means for detecting a first user input on a first application icon on the display; in response to detecting the first user input, means for activating and displaying a first application associated with the first application icon in a first region of the display; means for concurrently displaying a partial view of a second application in a second region of the display, distinct from the first region, without activating the second application; means for detecting a second user input on the partial view of the second application on the display; in response to detecting the second user input: means for suspending the first application and means for activating a full view of the second application on the display; means for detecting a third user input to deactivate the second application; and, in response to detecting the third user input: means for deactivating the second application and resuming the first application on the display.

In accordance with some embodiments, a method is performed at a multifunction device with a display and a touch-sensitive surface. In some embodiments, the display and the touch-sensitive surface are combined together into a touch-sensitive display. The method includes: detecting a first user input on a first application icon on the display; in response to detecting the first user input, activating and displaying a first application associated with the first application icon in a first region of the display; concurrently displaying a partial view of a second application in a second region of the display without activating the second application; detecting a second user input on the partial view of the second application on the display; in response to detecting the second user input: suspending the first application and activating a full view of the second application on the display; detecting a third user input on a respective icon in the second application; in response to detecting the third user input on the respective icon in the second application, activating a third application on the display; detecting a fourth user input to deactivate the third application; and, in response to detecting the fourth user input: deactivating the third application and resuming the first application on the display.

In accordance with some embodiments, a multifunction device includes a display, a touch-sensitive surface, one or more processors, memory, and one or more programs. The one or more programs are stored in the memory and configured to be executed by the one or more processors. The one or more programs include instructions for: detecting a first user input on a first application icon on the display; in response to detecting the first user input, activating and displaying a first application associated with the first application icon in a first region of the display; concurrently displaying a partial view of a second application in a second region of the display without activating the second application; detecting a second user input on the partial view of the second application on the display; in response to detecting the second user input: suspending the first application and activating a full view of the second application on the display; detecting a third user input on a respective icon in the second application; in response to detecting the third user input on the respective icon in the second application, activating a third application on the display; detecting a fourth user input to deactivate the third application; and in response to detecting the fourth user input: deactivating the third application and resuming the first application on the display.

In accordance with some embodiments, a computer readable storage medium has stored therein instructions which when executed by a multifunction device with a display and a touch-sensitive surface, cause the device to: detect a first user input on a first application icon on the display; in response to detecting the first user input, activate and display a first application associated with the first application icon in a first region of the display; concurrently display a partial view of a second application in a second region of the display without activating the second application; detect a second user input on the partial view of the second application on the display; in response to detecting the second user input: suspend the first application and activate a full view of the second application on the display; detect a third user input on a respective icon in the second application; in response to detecting the third user input on the respective icon in the second application, activate a third application on the display; detect a fourth user input to deactivate the third application; and, in response to detecting the fourth user input: deactivate the third application and resume the first application on the display.

In accordance with some embodiments, a graphical user interface on a multifunction device with a display, a touch-sensitive surface, a memory, and one or more processors to execute one or more programs stored in the memory includes a first application associated with a first application icon; a partial view of a second application; and a full view of the second application. In response to detecting a first user input on the first application icon on the display, a first application associated with the first application icon is activated and displayed in a first region of the display; a partial view of a second application is concurrently displayed in a second region of the display without activating the second application. In response to detecting a second user input on the partial view of the second application on the display: the first application is suspended; and a full view of the second application is activated on the display. In response to detecting a third user input on a respective icon in the second application, a third application is activated on the display. In response to detecting a fourth user input to deactivate the third application, the third application is deactivated on the display and the first application is resumed on the display.

In accordance with some embodiments, a multifunction device includes: a display; a touch-sensitive surface; means for detecting a first user input on a first application icon on the display; in response to detecting the first user input, means for activating and displaying a first application associated with the first application icon in a first region of the display; means for concurrently displaying a partial view of a second application in a second region of the display without activating the second application; means for detecting a second user input on the partial view of the second application on the display; in response to detecting the second user input: means for suspending the first application and activating a full view of the second application on the display; means for detecting a third user input on a respective icon in the second application; in response to detecting the third user input on the respective icon in the second application, means for activating a third application on the display; means for detecting a fourth user input to deactivate the third application; and, in response to detecting the fourth user input: means for deactivating the third application and means for resuming the first application on the display.

In accordance with some embodiments, an information processing apparatus for use in a multifunction device with a display and a touch-sensitive surface includes: means for detecting a first user input on a first application icon on the display; in response to detecting the first user input, means for activating and displaying a first application associated with the first application icon in a first region of the display; means for concurrently displaying a partial view of a second application in a second region of the display without activating the second application; means for detecting a second user input on the partial view of the second application on the display; in response to detecting the second user input: means for suspending the first application and activating a full view of the second application on the display; means for detecting a third user input on a respective icon in the second application; in response to detecting the third user input on the respective icon in the second application, means for activating a third application on the display; means for detecting a fourth user input to deactivate the third application; and, in response to detecting the fourth user input: means for deactivating the third application and means for resuming the first application on the display.

In accordance with some embodiments, a method is performed at a multifunction device with a display and a touch-sensitive surface. In some embodiments, the display and the touch-sensitive surface are combined together into a touch-sensitive display. The method includes: detecting a first user input on a first application icon on the display; in response to detecting the first user input, activating and displaying a first application associated with the first application icon in a first region of the display; concurrently displaying a partial view of a second application in a second region of the display, distinct from the first region, at a predefined scale, without activating the second application; detecting a second user input on the partial view of the second application on the display; and, in response to detecting the second user input: displaying a full view of the second application at the predefined scale and activating the second application.

In accordance with some embodiments, a multifunction device includes a display, a touch-sensitive surface, one or more processors, memory, and one or more programs. The one or more programs are stored in the memory and configured to be executed by the one or more processors. The one or more programs include instructions for: detecting a first user input on a first application icon on the display; in response to detecting the first user input, activating and displaying a first application associated with the first application icon in a first region of the display; concurrently displaying a partial view of a second application in a second region of the display, distinct from the first region, at a predefined scale, without activating the second application; detecting a second user input on the partial view of the second application on the display; and, in response to detecting the second user input: displaying a full view of the second application at the predefined scale and activating the second application.

In accordance with some embodiments, a computer readable storage medium has stored therein instructions which when executed by a multifunction device with a display and a touch-sensitive surface, cause the device to: detect a first user input on a first application icon on the display; in response to detecting the first user input, activate and display a first application associated with the first application icon in a first region of the display; concurrently display a partial view of a second application in a second region of the display, distinct from the first region, at a predefined scale, without activating the second application; detect a second user input on the partial view of the second application on the display; and, in response to detecting the second user input: display a full view of the second application at the predefined scale and activate the second application.

In accordance with some embodiments, a graphical user interface on a multifunction device with a display, a touch-sensitive surface, a memory, and one or more processors to execute one or more programs stored in the memory includes a first application associated with a first application icon; a partial view of a second application; and a full view of the second application. In response to detecting a first user input on the first application icon on the display, a first application associated with the first application icon is activated and displayed in a first region of the display. A partial view of a second application is concurrently displayed in a second region of the display, distinct from the first region, at a predefined scale, without activating the second application. In response to detecting a second user input on the partial view of the second application on the display: a full view of the second application is activated and displayed at the predefined scale.

In accordance with some embodiments, a multifunction device includes: a display; a touch-sensitive surface; means for detecting a first user input on a first application icon on the display; in response to detecting the first user input, means for activating and displaying a first application associated with the first application icon in a first region of the display; means for concurrently displaying a partial view of a second application in a second region of the display, distinct from the first region, at a predefined scale, without activating the second application; means for detecting a second user input on the partial view of the second application on the display; and, in response to detecting the second user input, means for displaying a full view of the second application at the predefined scale and means for activating the second application.

In accordance with some embodiments, an information processing apparatus for use in a multifunction device with a display and a touch-sensitive surface includes: means for detecting a first user input on a first application icon on the display; in response to detecting the first user input, means for activating and displaying a first application associated with the first application icon in a first region of the display; means for concurrently displaying a partial view of a second application in a second region of the display, distinct from the first region, at a predefined scale, without activating the second application; means for detecting a second user input on the partial view of the second application on the display; and, in response to detecting the second user input, means for displaying a full view of the second application at the predefined scale and means for activating the second application.

In accordance with some embodiments, a method is performed at a multifunction device with a display and a touch-sensitive surface. In some embodiments, the display and the touch-sensitive surface are combined together into a touch-sensitive display. The method includes: displaying a first view in a first application on the display, the first view including a first user selectable object that is associated with a second view in the first application; detecting a first user input on the first user selectable object; in response to detecting the first user input, animatedly replacing display of the first view with display of a view that includes a second user selectable object at a first predefined scale, the second user selectable object being associated with a second application distinct from the first application; detecting a second user input on the second user selectable object; in response to detecting the second user input: animatedly enlarging the second user selectable object from the first predefined scale to a second predefined scale, activating the second application, and displaying a deactivation icon on the display; detecting a third user input on the deactivation icon; and, in response to detecting the third user input: deactivating the second application and displaying the second view in the first application.

In accordance with some embodiments, a multifunction device includes a display, a touch-sensitive surface, one or more processors, memory, and one or more programs. The one or more programs are stored in the memory and configured to be executed by the one or more processors. The one or more programs include instructions for: displaying a first view in a first application on the display, the first view including a first user selectable object that is associated with a second view in the first application; detecting a first user input on the first user selectable object; in response to detecting the first user input, animatedly replacing display of the first view with display of a view that includes a second user selectable object at a first predefined scale, the second user selectable object being associated with a second application distinct from the first application; detecting a second user input on the second user selectable object; in response to detecting the second user input: animatedly enlarging the second user selectable object from the first predefined scale to a second predefined scale, activating the second application, and displaying a deactivation icon on the display; detecting a third user input on the deactivation icon; and, in response to detecting the third user input: deactivating the second application and displaying the second view in the first application.

In accordance with some embodiments, a computer readable storage medium has stored therein instructions which when executed by a multifunction device with a display and a touch-sensitive surface, cause the device to: display a first view in a first application on the display, the first view including a first user selectable object that is associated with a second view in the first application; detect a first user input on the first user selectable object; in response to detecting the first user input, animatedly replace display of the first view with display of a view that includes a second user selectable object at a first predefined scale, the second user selectable object being associated with a second application distinct from the first application; detect a second user input on the second user selectable object; in response to detecting the second user input: animatedly enlarge the second user selectable object from the first predefined scale to a second predefined scale, activate the second application, and display a deactivation icon on the display; detect a third user input on the deactivation icon; and, in response to detecting the third user input: deactivate the second application and display the second view in the first application.

In accordance with some embodiments, a graphical user interface on a multifunction device with a display, a touch-sensitive surface, a memory, and one or more processors to execute one or more programs stored in the memory includes a first view in a first application on the display, the first view including a first user selectable object that is associated with a second view in the first application. In response to detecting a first user input on the first user selectable object, the display of the first view is animatedly replaced with display of a view that includes a second user selectable object at a first predefined scale, the second user selectable object being associated with a second application distinct from the first application. In response to detecting a second user input on the second user selectable object, the second user selectable object is animatedly enlarged from the first predefined scale to a second predefined scale, the second application is activated and a deactivation icon is displayed on the display. In response to detecting a third user input on the deactivation icon, the second application is deactivated and the second view is displayed in the first application.

In accordance with some embodiments, a multifunction device includes: a display; a touch-sensitive surface; means for displaying a first view in a first application on the display, the first view including a first user selectable object that is associated with a second view in the first application; means for detecting a first user input on the first user selectable object; in response to detecting the first user input, means for animatedly replacing display of the first view with display of a view that includes a second user selectable object at a first predefined scale, the second user selectable object being associated with a second application distinct from the first application; means for detecting a second user input on the second user selectable object; in response to detecting the second user input: means for animatedly enlarging the second user selectable object from the first predefined scale to a second predefined scale, means for activating the second application, and means for displaying a deactivation icon on the display; means for detecting a third user input on the deactivation icon; and, in response to detecting the third user input: means for deactivating the second application and means for displaying the second view in the first application.

In accordance with some embodiments, an information processing apparatus for use in a multifunction device with a display and a touch-sensitive surface includes: means for displaying a first view in a first application on the display, the first view including a first user selectable object that is associated with a second view in the first application; means for detecting a first user input on the first user selectable object; in response to detecting the first user input, means for animatedly replacing display of the first view with display of a view that includes a second user selectable object at a first predefined scale, the second user selectable object being associated with a second application distinct from the first application; means for detecting a second user input on the second user selectable object; in response to detecting the second user input: means for animatedly enlarging the second user selectable object from the first predefined scale to a second predefined scale, means for activating the second application, and means for displaying a deactivation icon on the display; means for detecting a third user input on the deactivation icon; and, in response to detecting the third user input: means for deactivating the second application and means for displaying the second view in the first application.

Thus, multifunction devices with displays and touch-sensitive surfaces are provided with faster, more efficient methods and interfaces for navigating between multiple applications, thereby increasing the effectiveness, efficiency, and user satisfaction with such devices. Such methods and interfaces may complement or replace conventional application navigation methods.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 1C is a block diagram illustrating exemplary components for event handling in accordance with some embodiments.

DESCRIPTION OF EMBODIMENTS

Figure 1A:
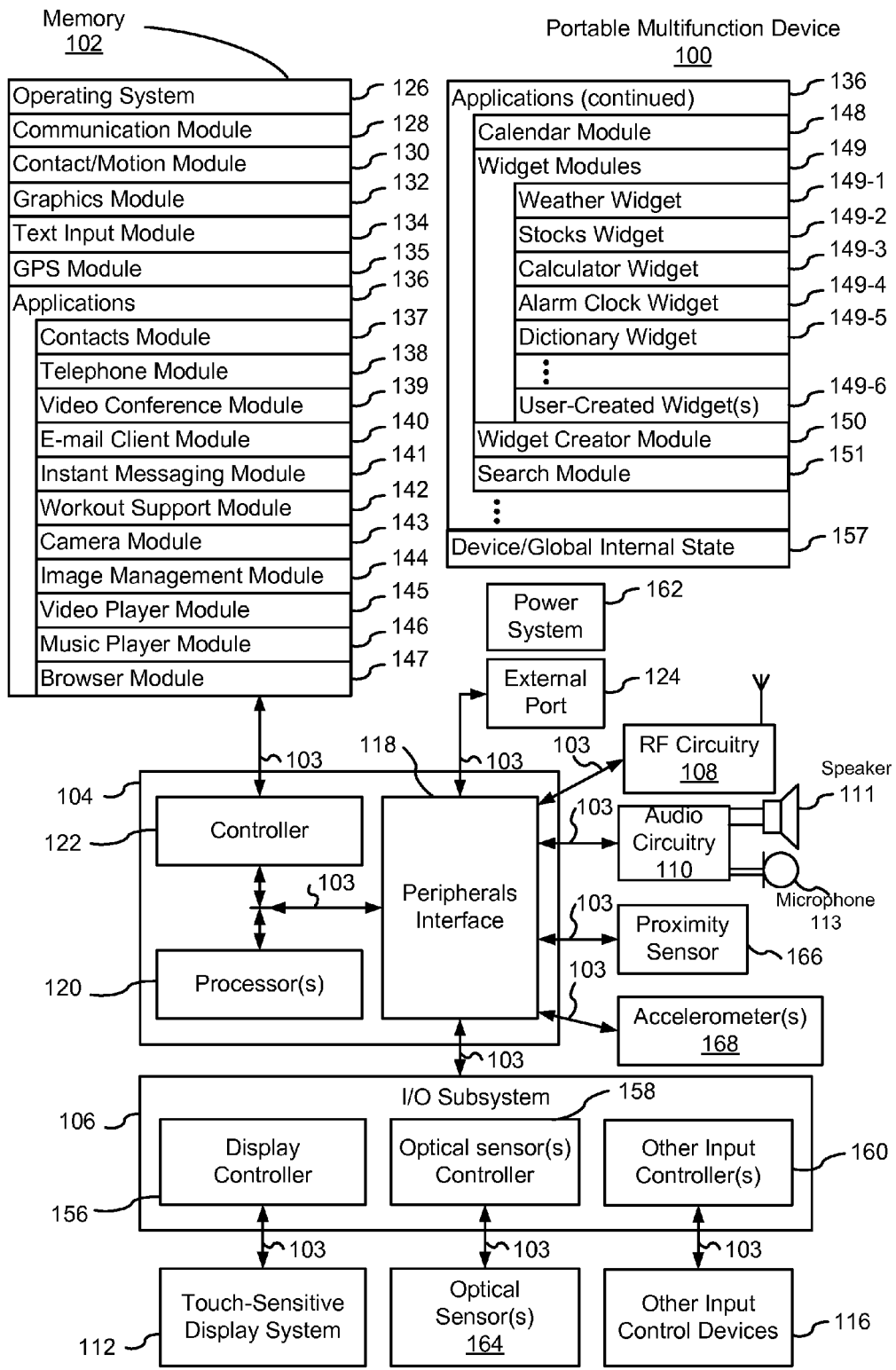
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® and iPod Touch® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
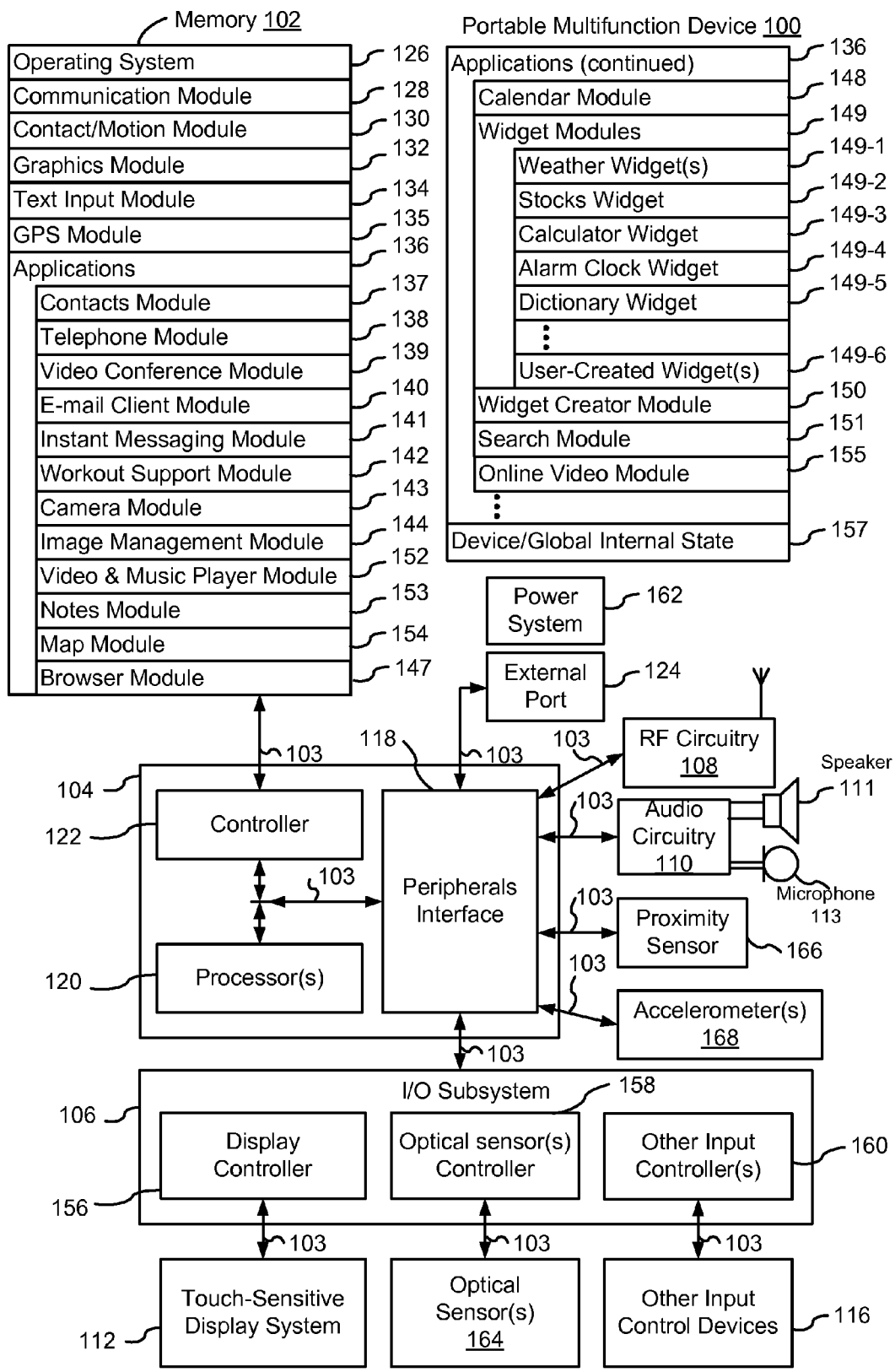

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
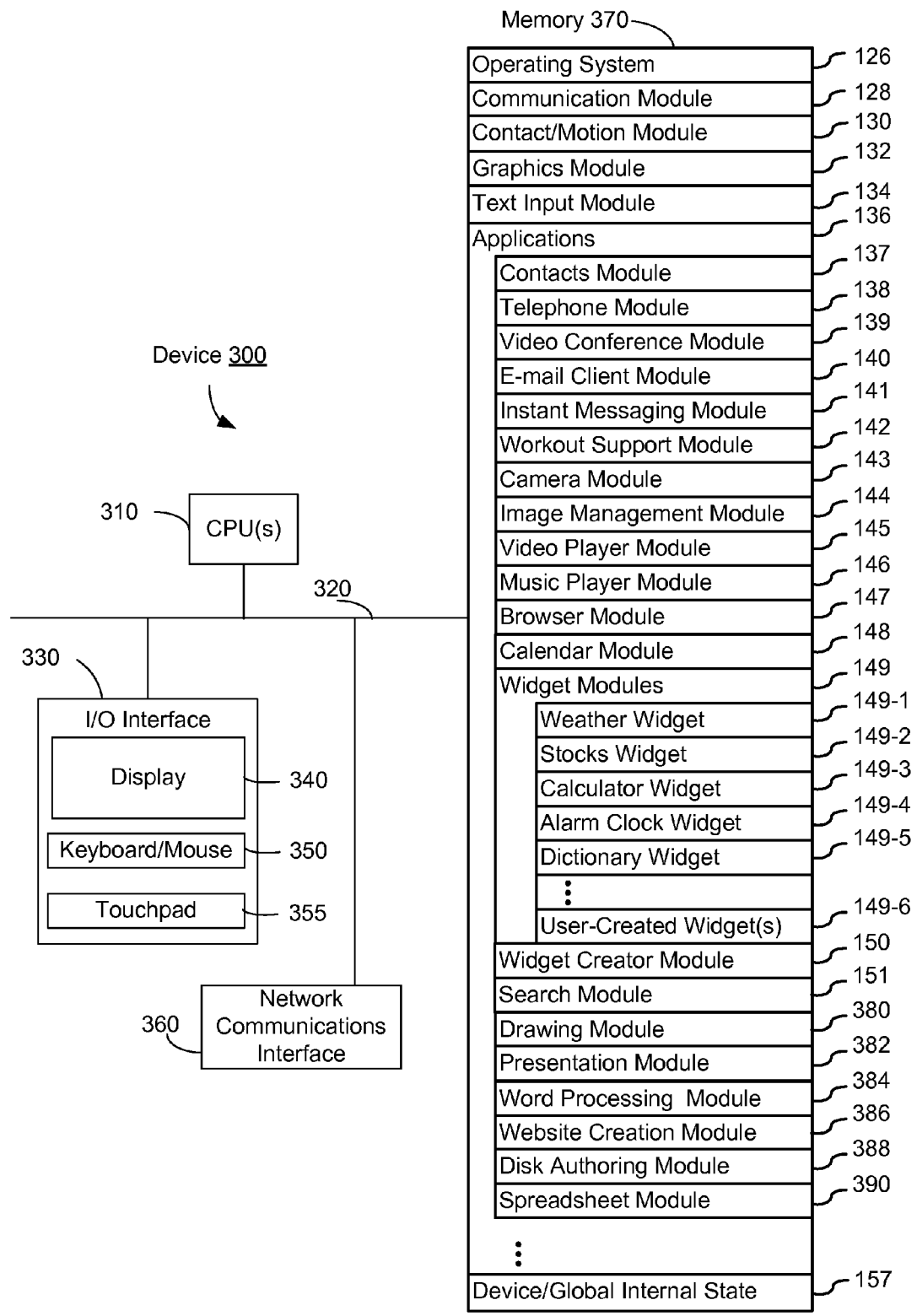
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module 145;
  music player module 146;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module 145 and music player module 146;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
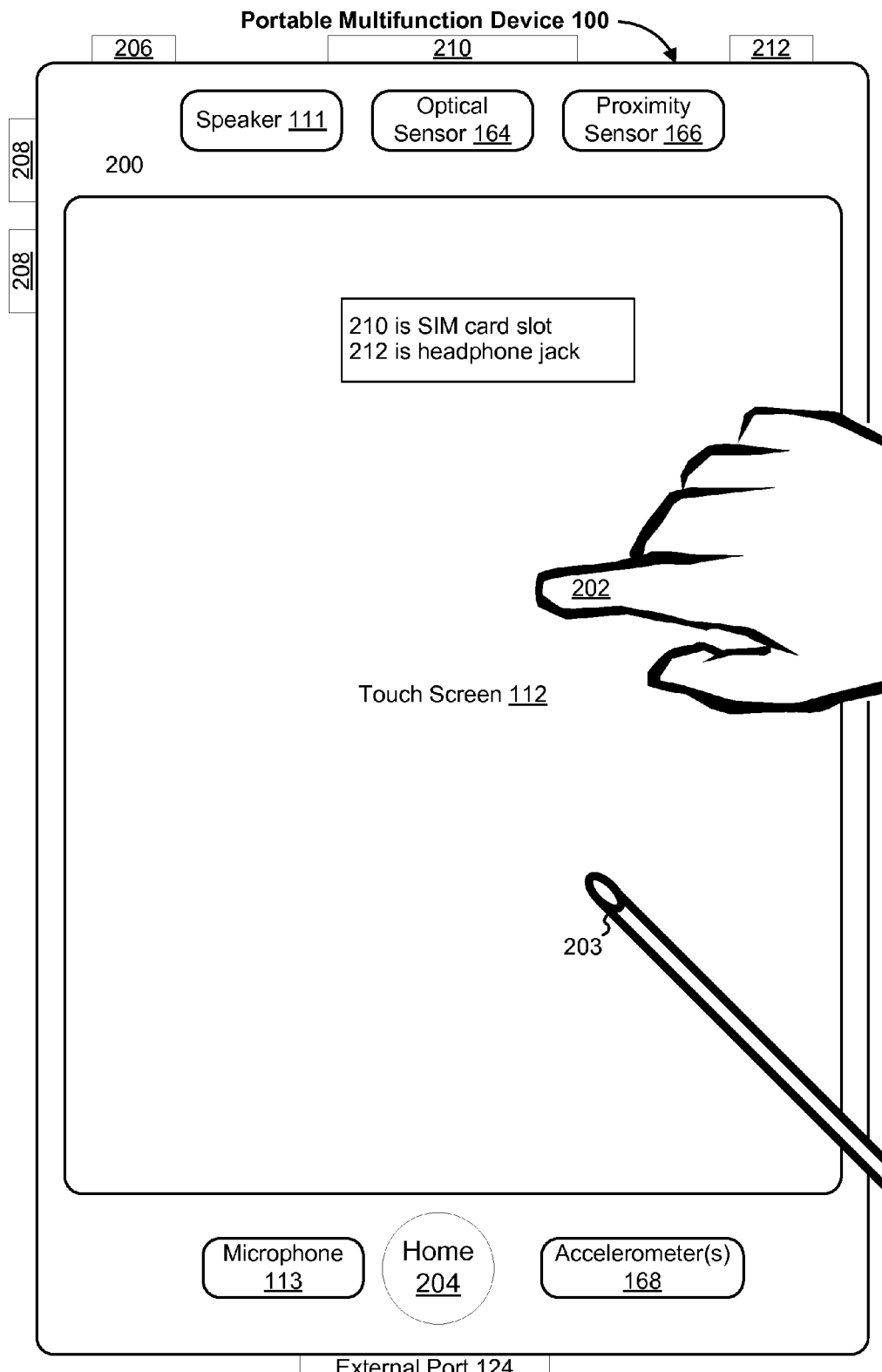
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
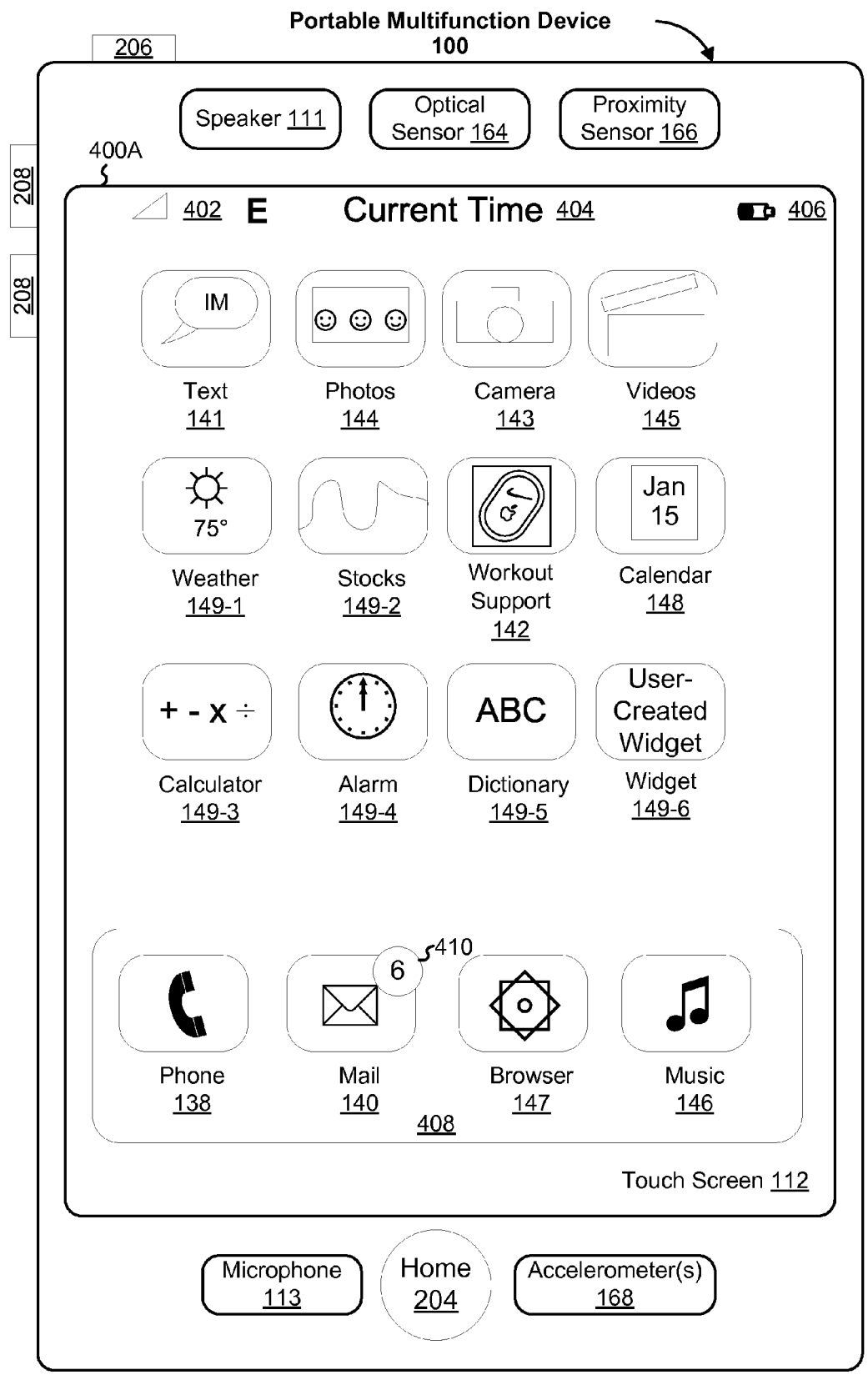
FIGS. 4A and 4B illustrate exemplary user interfaces for a menu of applications on a portable multifunction device in accordance with some embodiments.
Figure 4B:
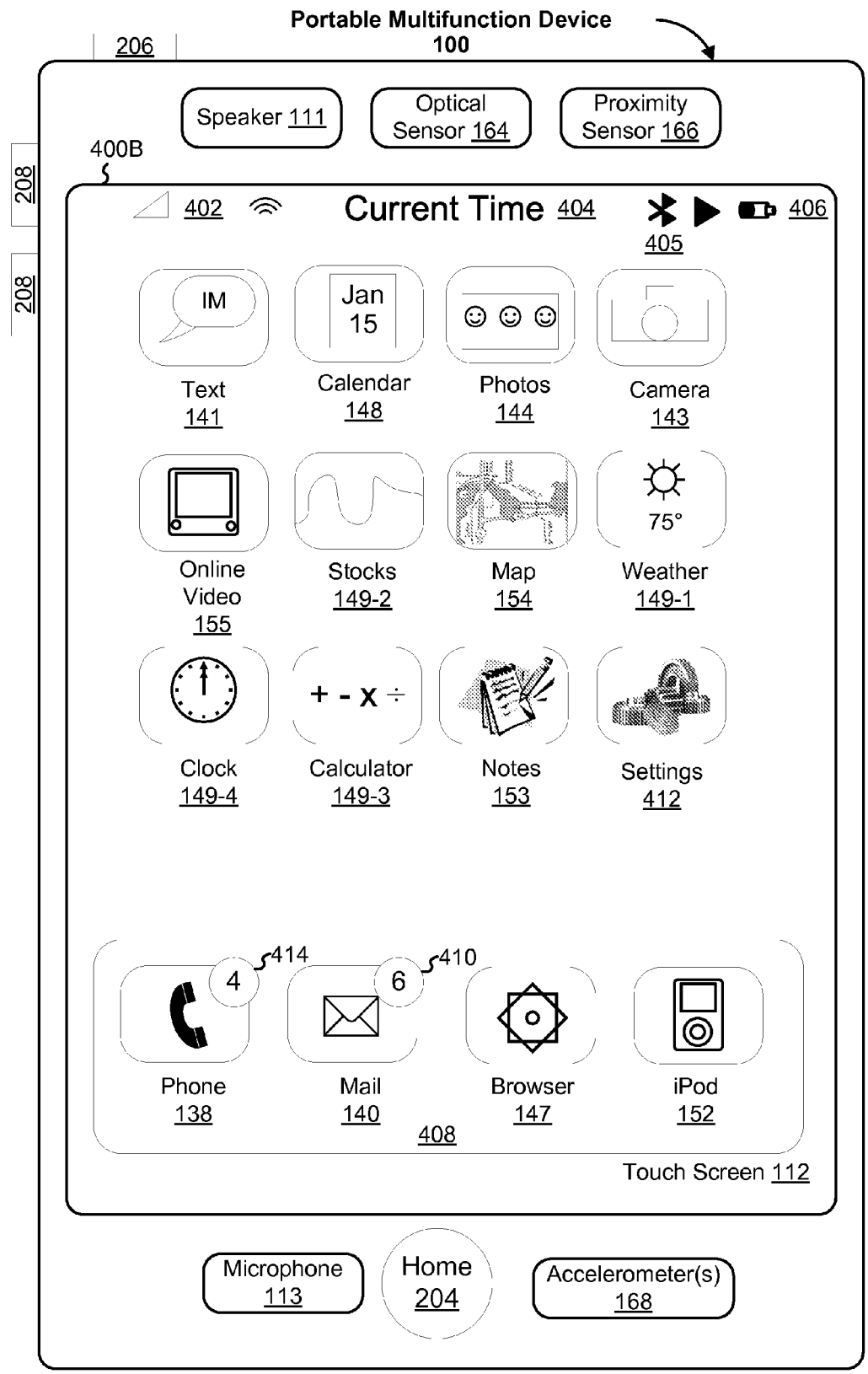

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Phone 138, which may include an indicator 414 of the number of missed calls or voicemail messages;

E-mail client 140, which may include an indicator 410 of the number of unread e-mails;
Browser 147; and
Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:
  402, 404, 405, 406, 141, 148, 144, 143, 149-3, 149-2, 149-1, 149-4, 410, 414, 138, 140, and 147, as described above;
  Map 154;
  Notes 153;
  Settings 412, which provides access to settings for device 100 and its various applications 136, as described further below;
  Video and music player module 152, also referred to as iPod (trademark of Apple Inc.) module 152; and
  Online video module 155, also referred to as YouTube (trademark of Google Inc.) module 155.

Figure 4C:
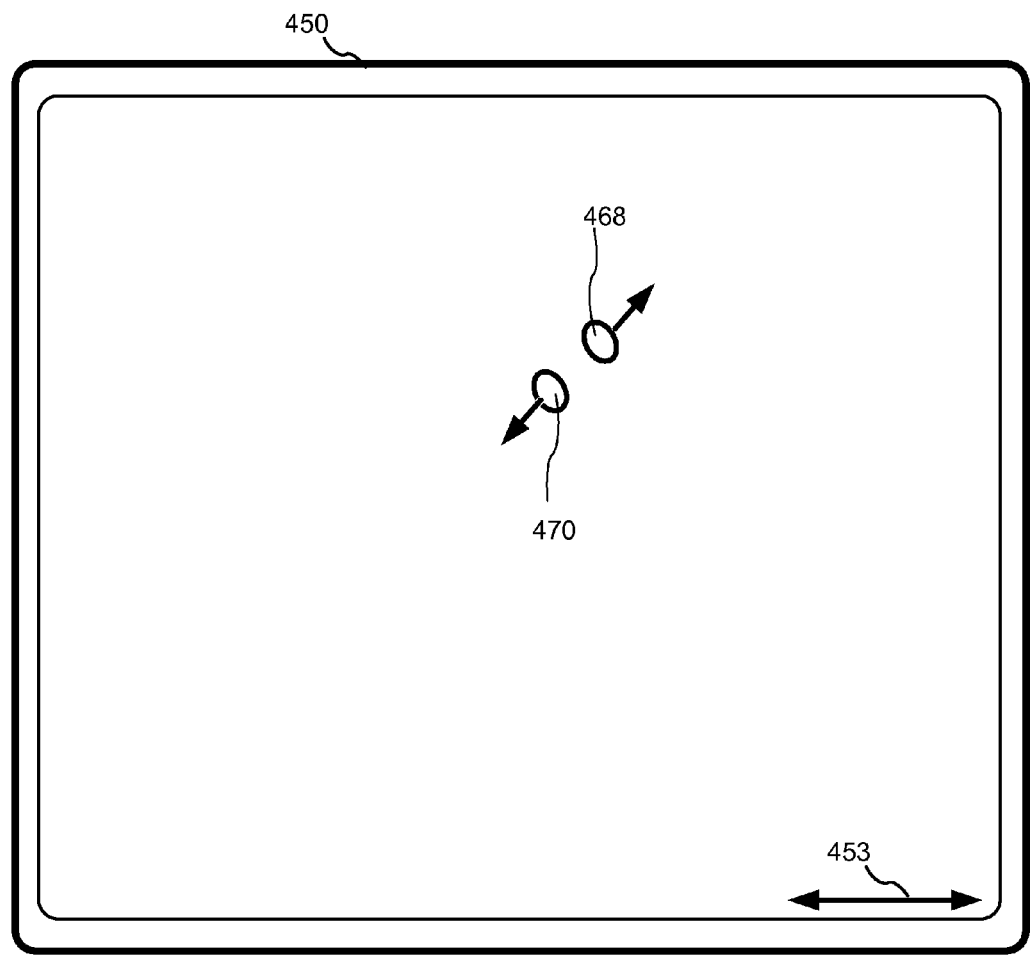
FIG. 4C illustrates an exemplary user interface for a multifunction device with a touch-sensitive surface that is separate from the display in accordance with some embodiments.
Figure 4C:
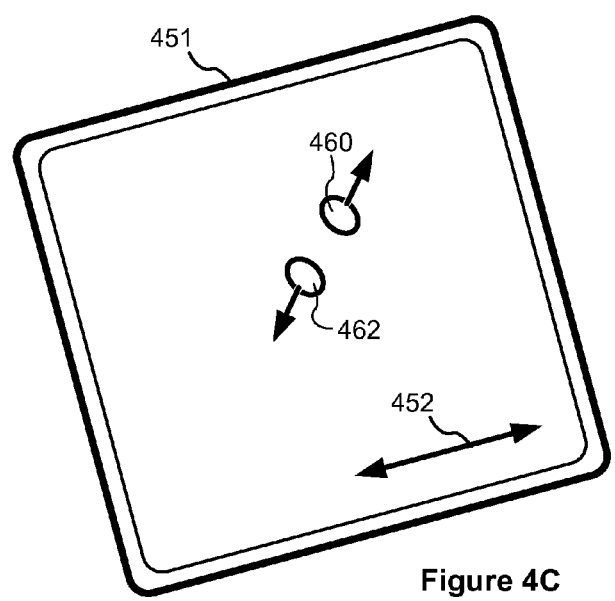

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Attention is now directed towards embodiments of user interfaces ("UI") and associated processes that may be implemented on a multifunction device with a display and a touch-sensitive surface, such as device 300 or portable multifunction device 100.

FIGS. 5A-5M illustrate exemplary user interfaces for navigating between multiple applications in accordance with some embodiments. The user interfaces in these figures are used to illustrate the processes described below, including the processes in FIGS. 6A-6C, 7A-7B, 8 and 9.

As will be explained in detail below, the exemplary user interfaces depict how a computing device with a touch-sensitive display, in response to user inputs, switches between multiple applications, including replacing a first application with a second application, replacing the second application with a third application on the display, suspending a replaced application and removing the replaced application from the display, and subsequently bringing back a suspended application on the display and resuming its operation.

Figure 5A:
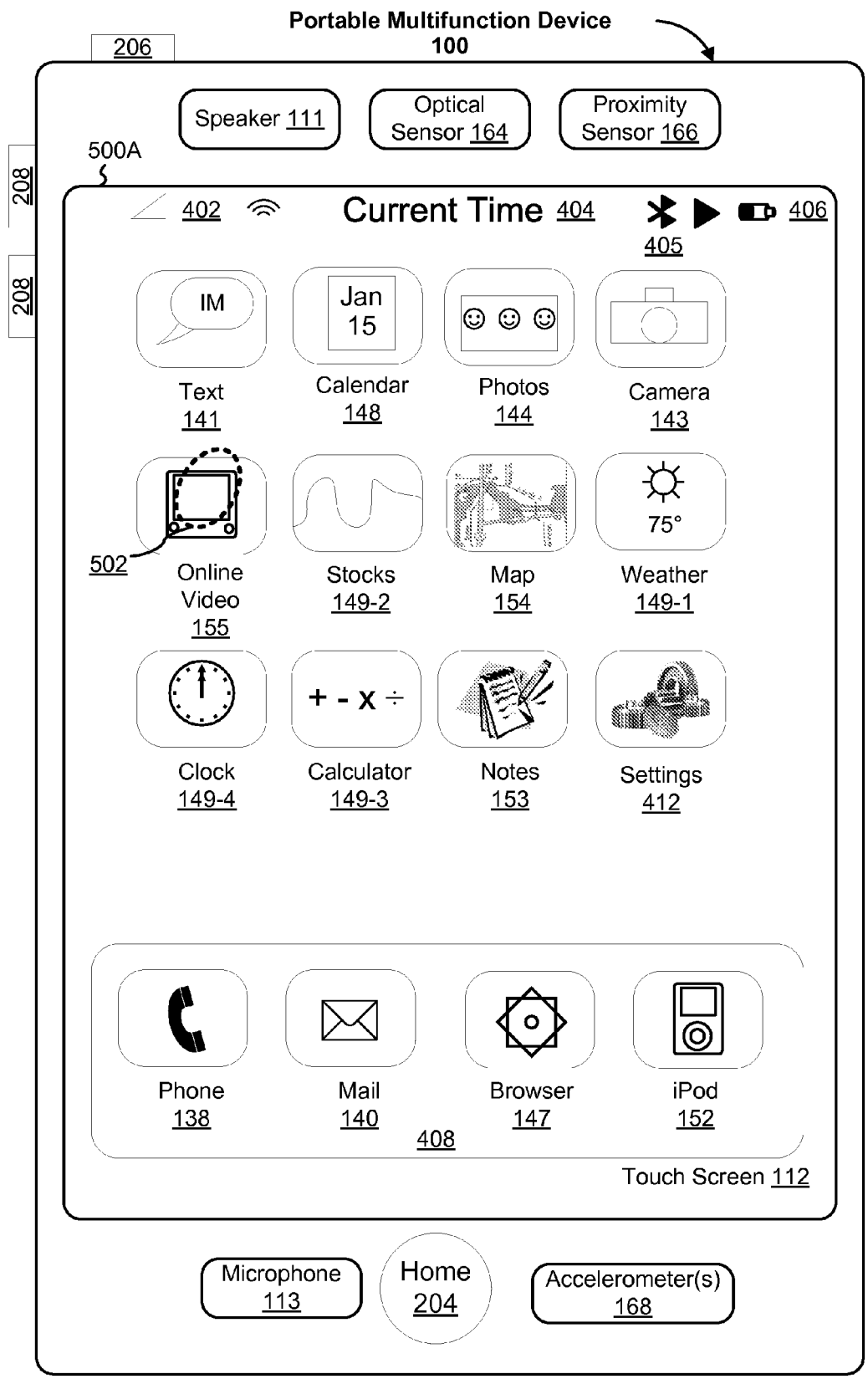
FIGS. 5A-5M illustrate exemplary user interfaces for navigating between multiple applications in accordance with some embodiments.
Figure 5B:
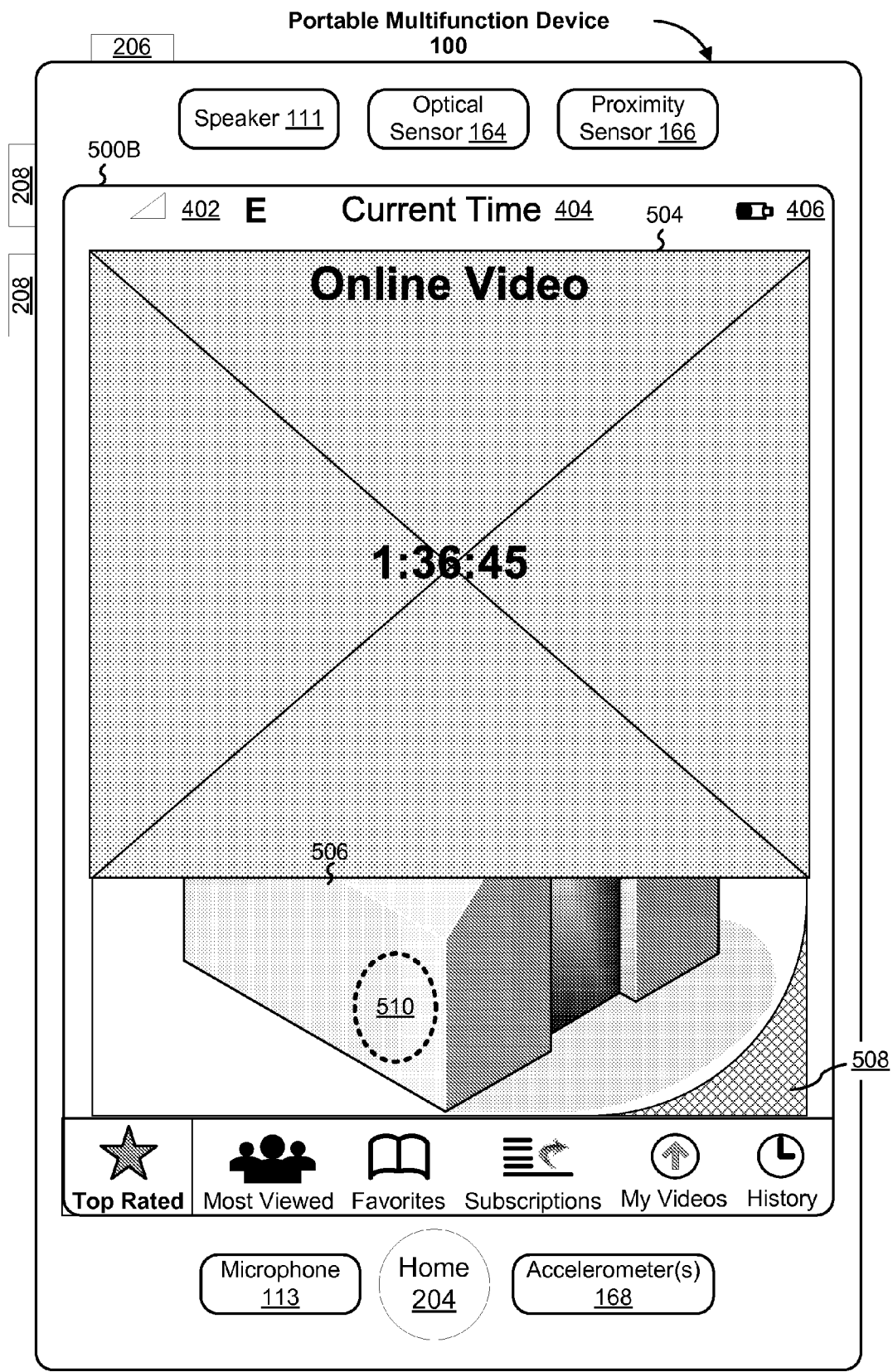

FIG. 5A depicts a user interface 500A of a portable multifunction device that includes multiple application icons. A finger tap 502 on the Online Video application icon 155 is detected. FIG. 5B depicts a user interface 500B displayed in response to the finger tap 502, which includes a first application 504 (in this example, the Online Video application) and a partial view of a second application 506 (in this example, an advertising application). A finger tap 510 on the second application 506 is detected.

Figure 5C:
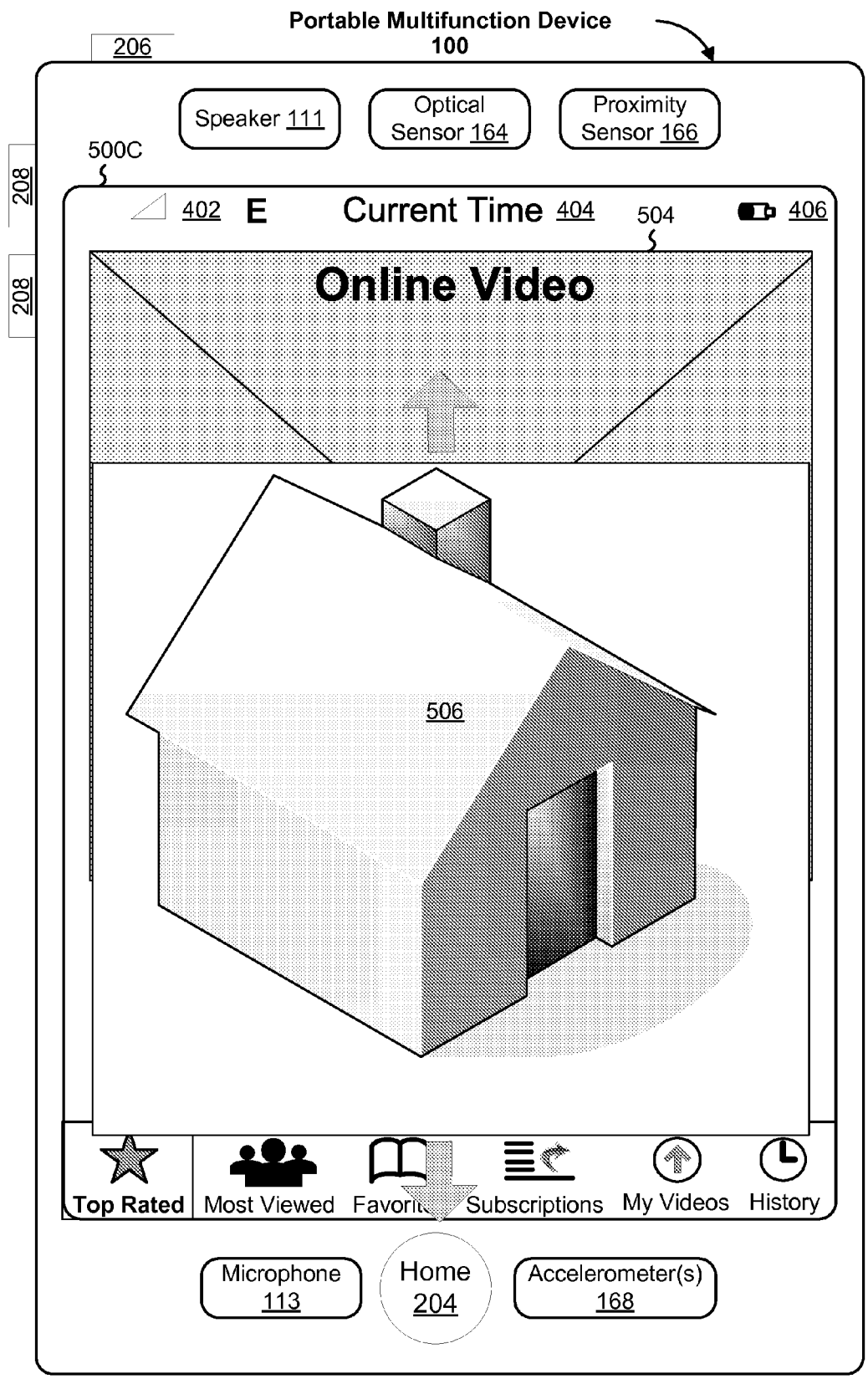
Figure 5D:
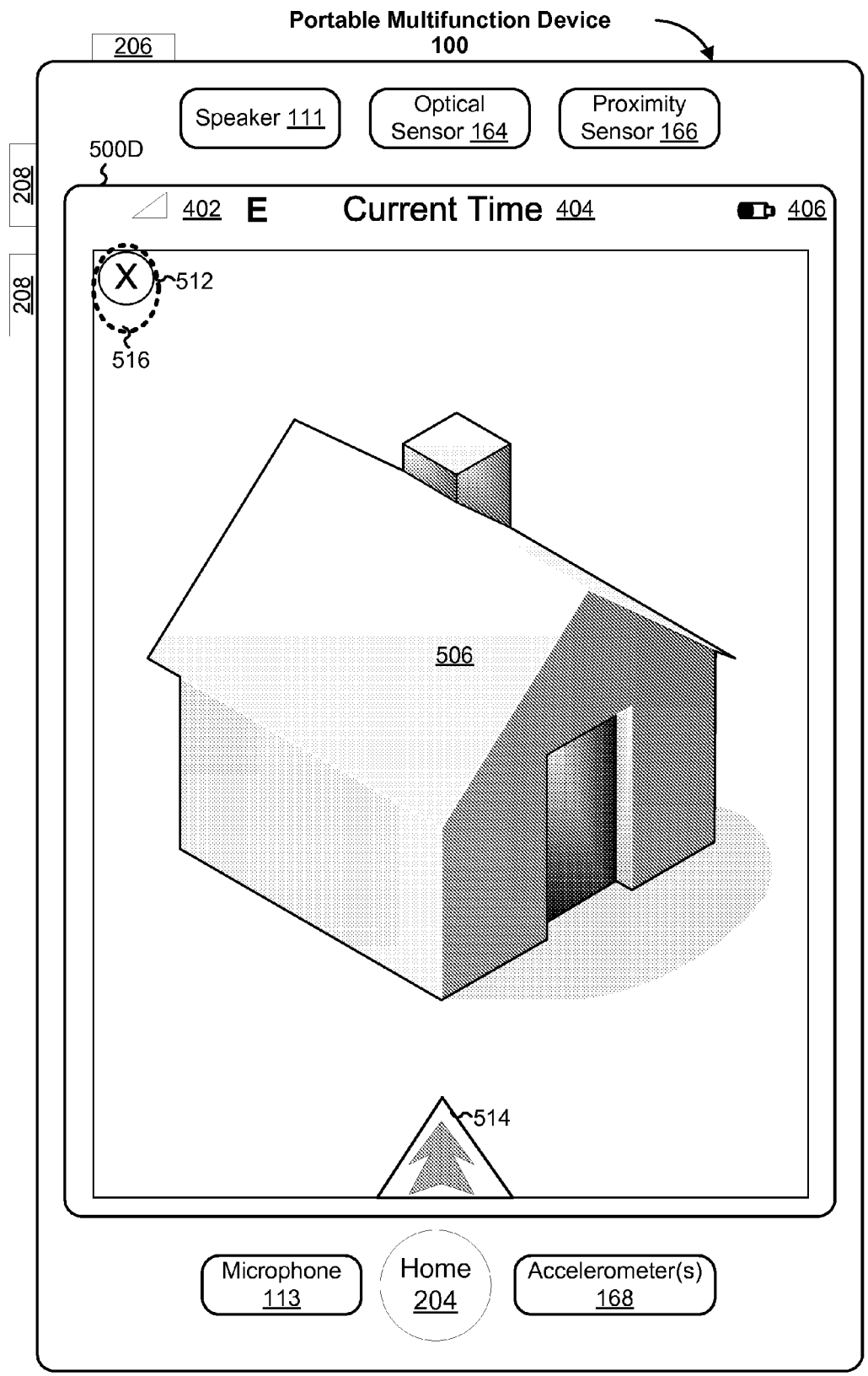

FIGS. 5C and 5D depict user interfaces 500C and 500D in which in an animation transitions to a full view of the second application 506. In this example, the scale of objects in the second application 506 is maintained from the partial view to the full view, thereby creating a smoother, less jarring transition to the second application. In addition, a deactivation icon 512 in FIG. 5D is displayed in the full view of the second application.

Figure 5E:
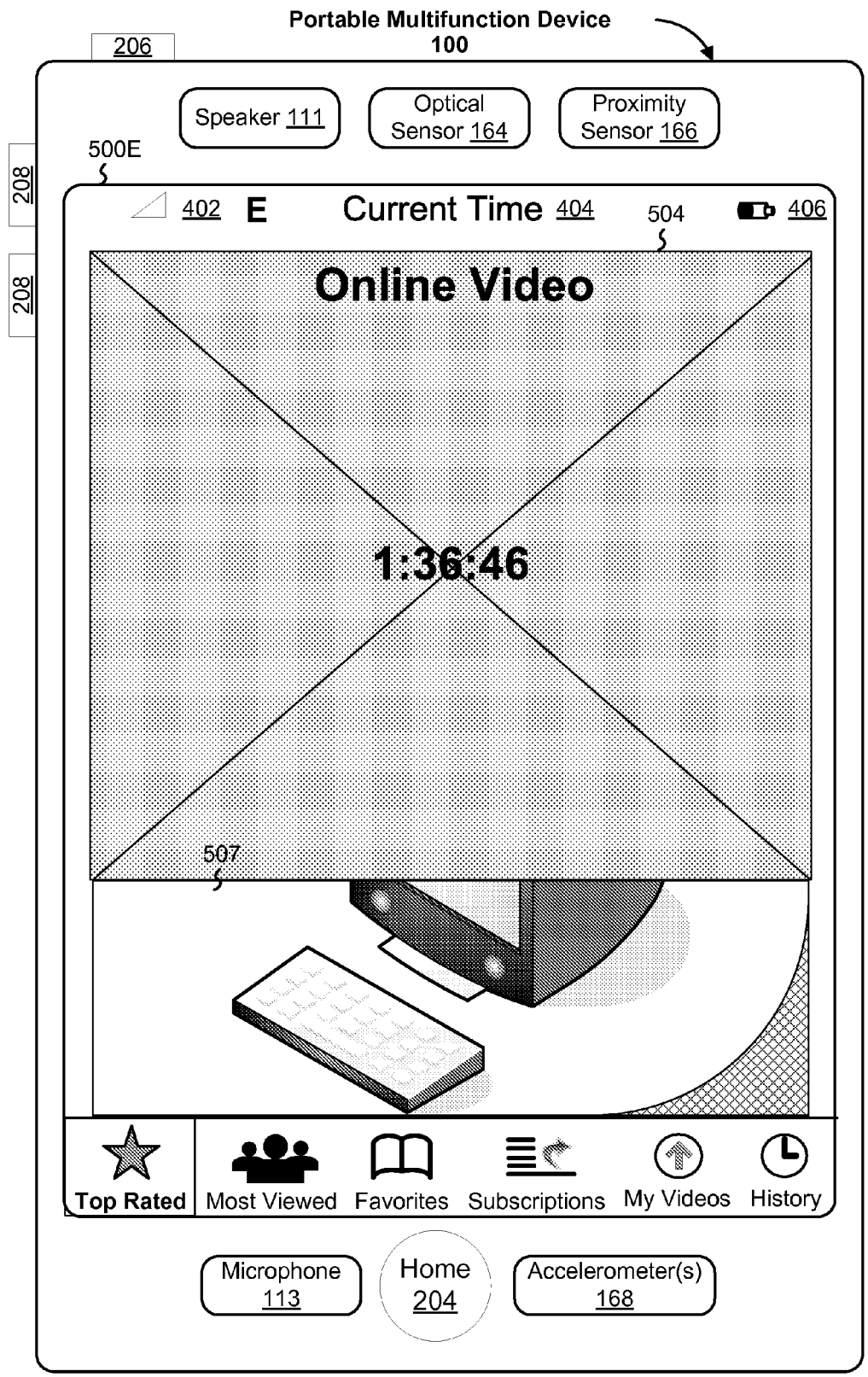

As shown in FIGS. 5D-5E, a finger tap 516 on the deactivation icon 512 brings back the first application 504 on the display and resumes the play of the video. Note that the partial view of application 507 in FIG. 5E may or may not be the same partial view in the same application 506 shown in FIG. 5B.

Figure 5F:
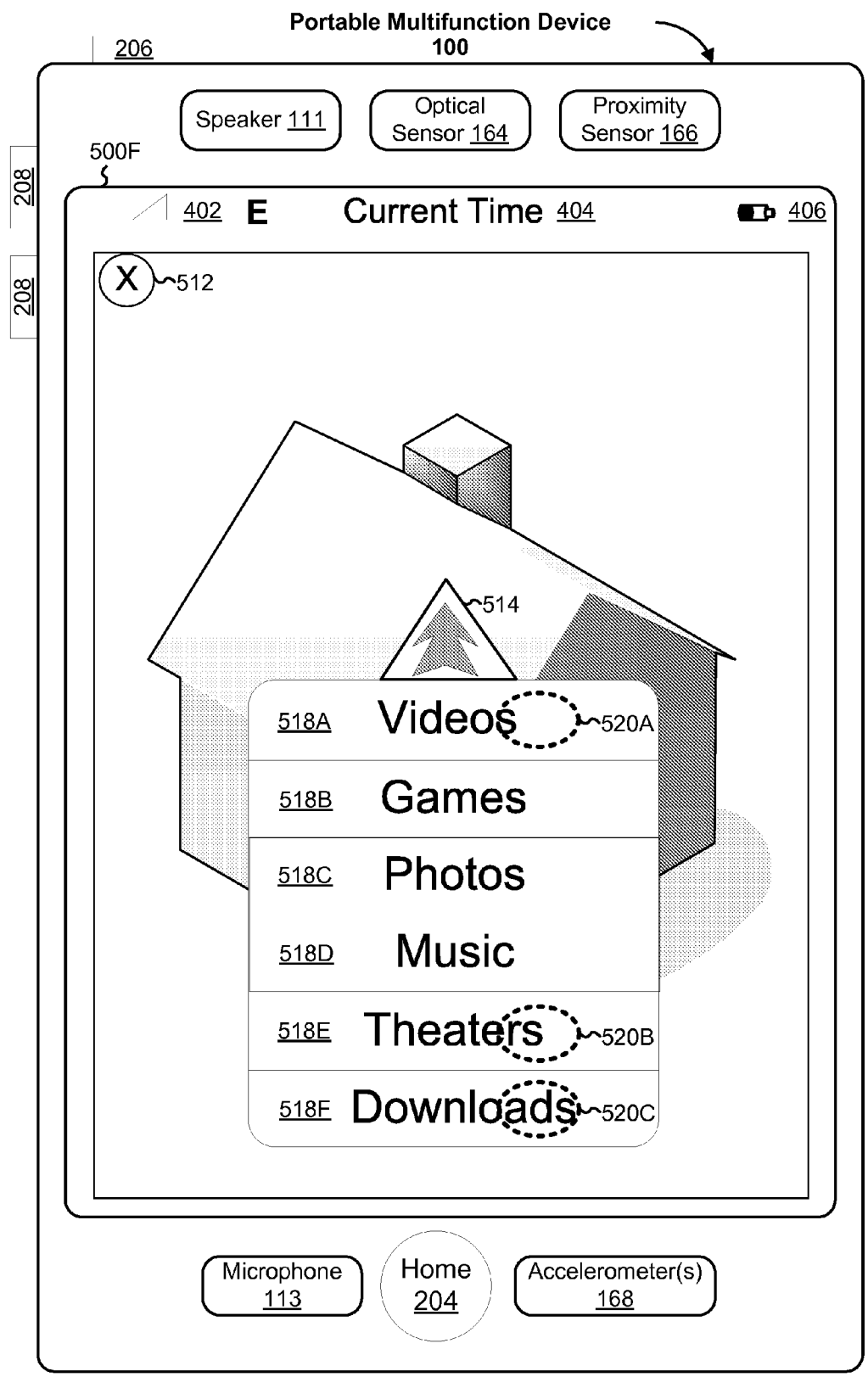

FIG. 5D also depicts a services icon 514 at the bottom of the full view of the second application. In response to detecting a gesture (e.g., a finger tap gesture) on the services icon 514, a list of icons corresponding to service applications associated with the second application 506 is shown (e.g., as depicted in FIG. 5F).

Figure 5G:
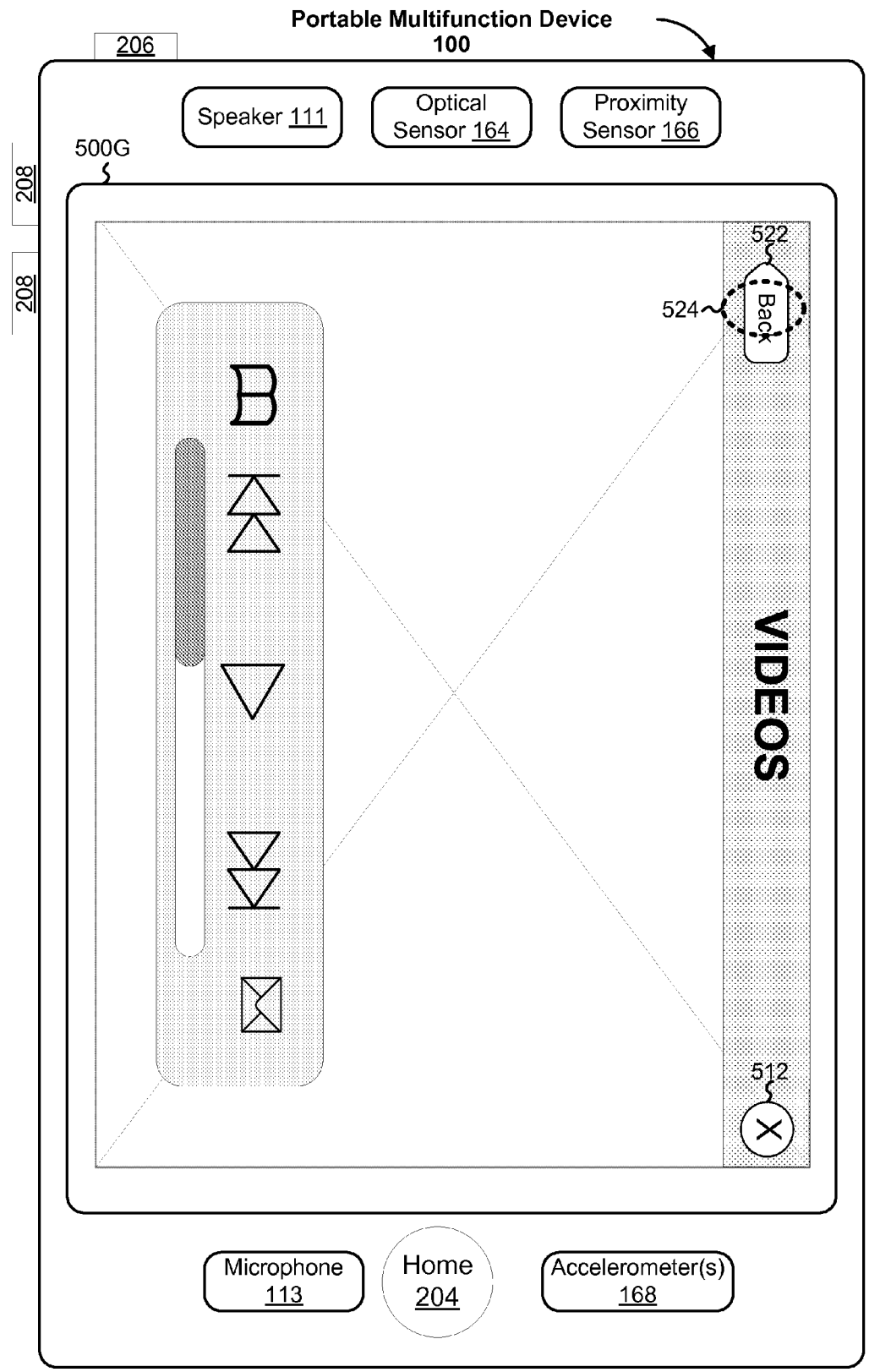
Figure 5H:
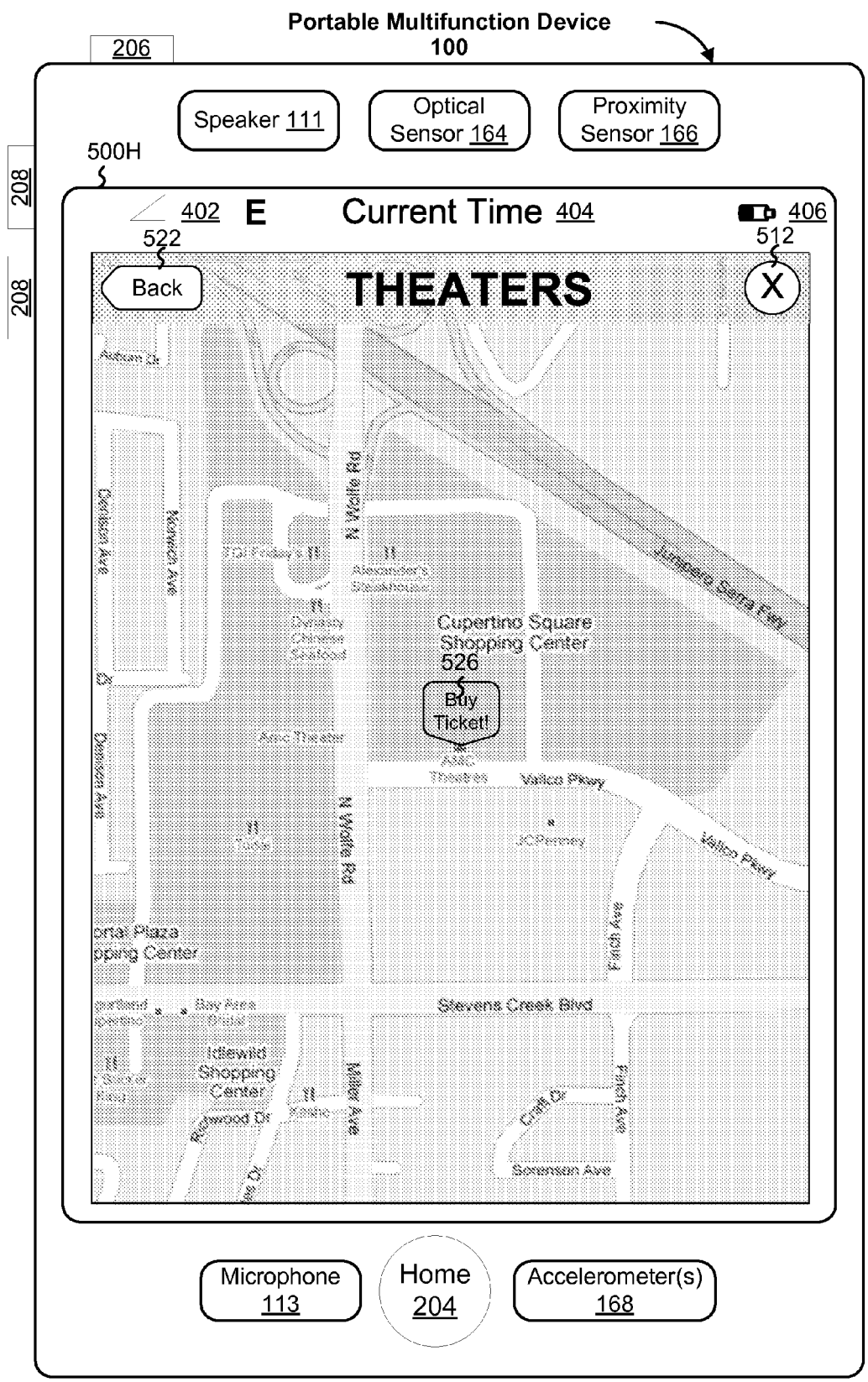
Figure 5I:
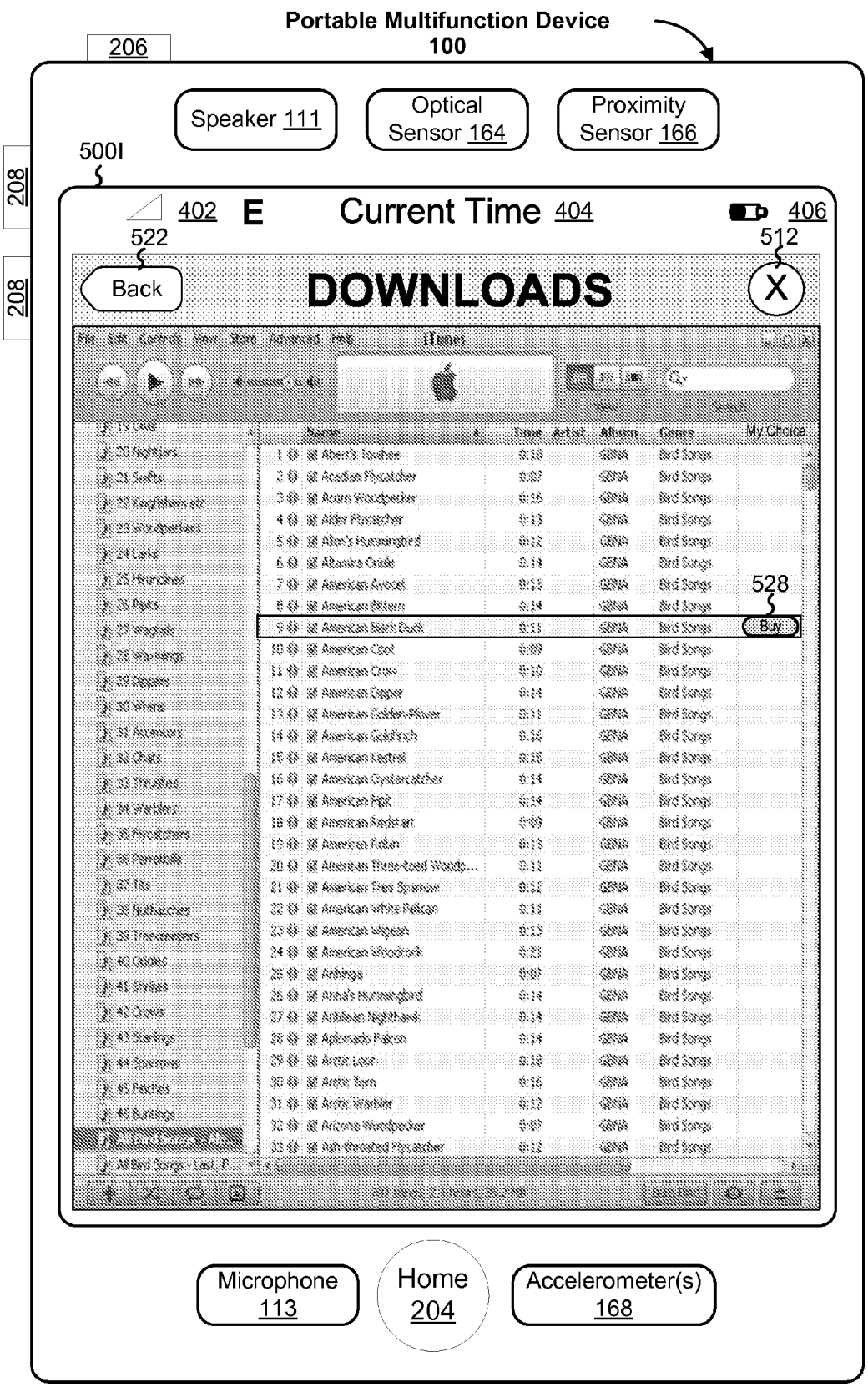

FIGS. 5G-5I depict user interfaces 500G, 500H, and 500I that correspond to a video player, a theater location map, and a music download service, respectively. Each of the three service applications is activated in response to detecting a user gesture (e.g., a finger tap gesture) on a corresponding icon shown in FIG. 5F. Each user interface includes a deactivation icon 512 and a back icon 522. Detecting user selection of the deactivation icon 512 brings the device back to the first application 504, e.g., as shown in FIG. 5B or 5E. Detecting user selection of the back icon 522 brings the device back to the full view of the second application 506, e.g., as shown in FIG. 5D or 5F.

Figure 5J:
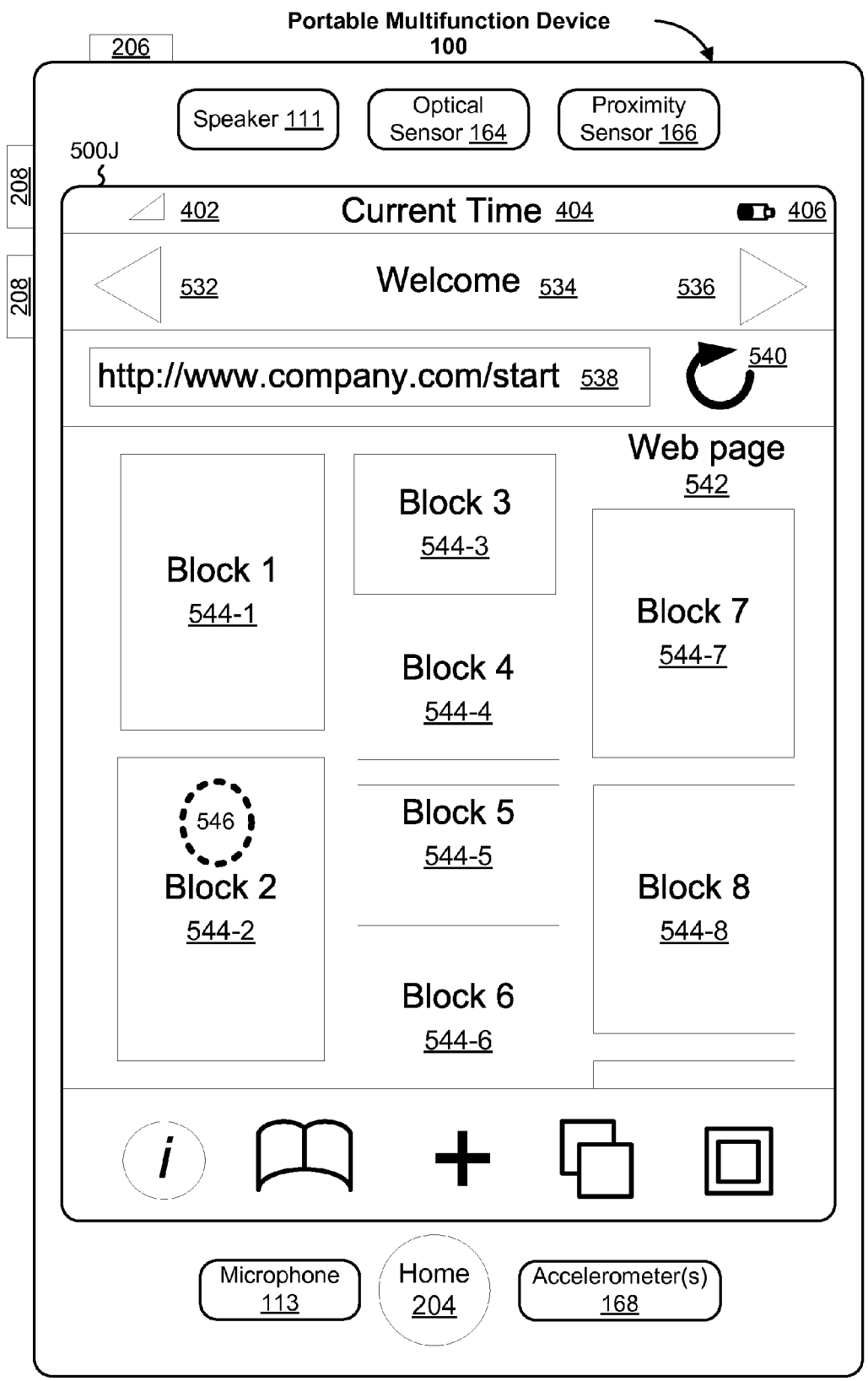
Figure 5K:
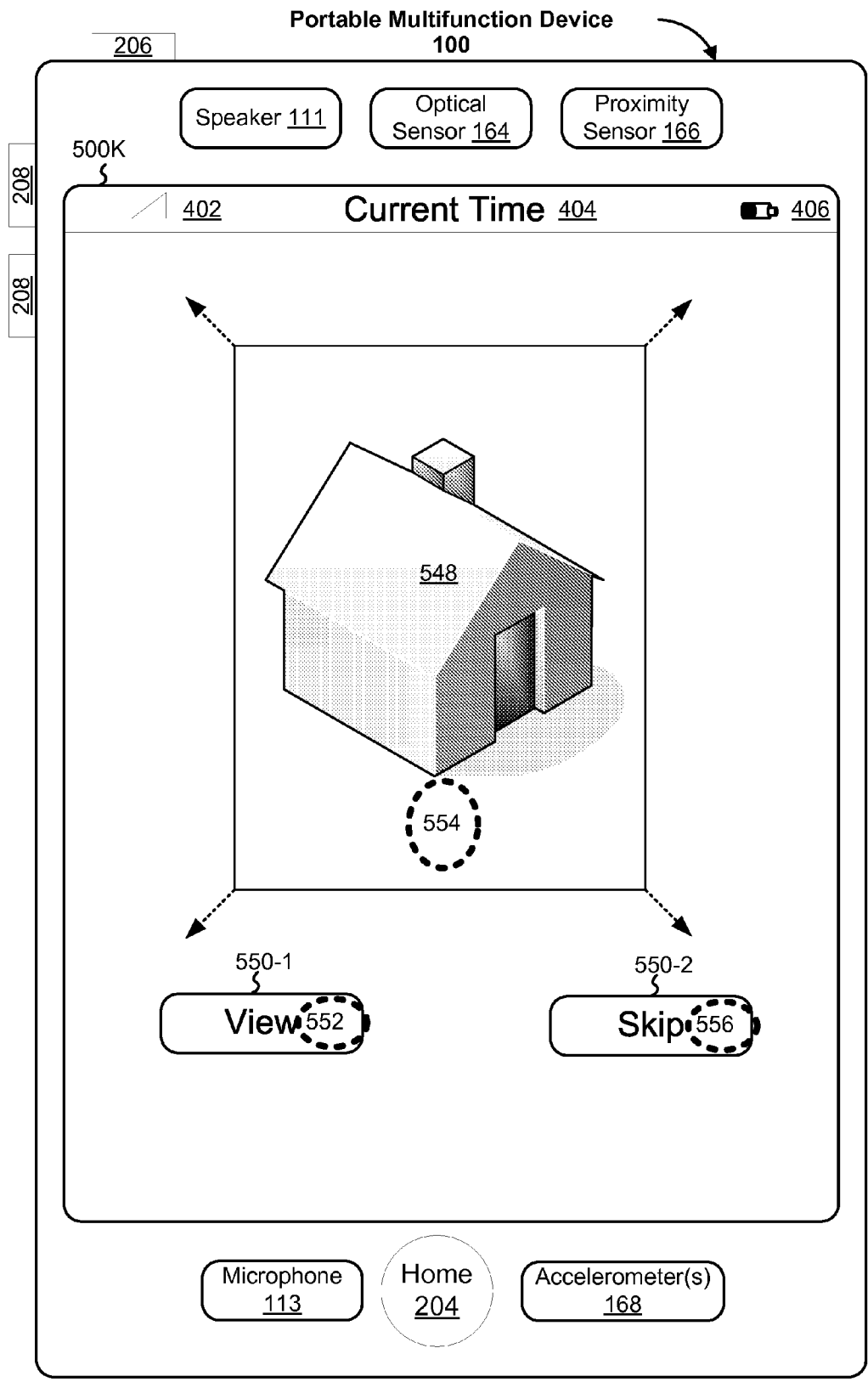
Figure 5L:
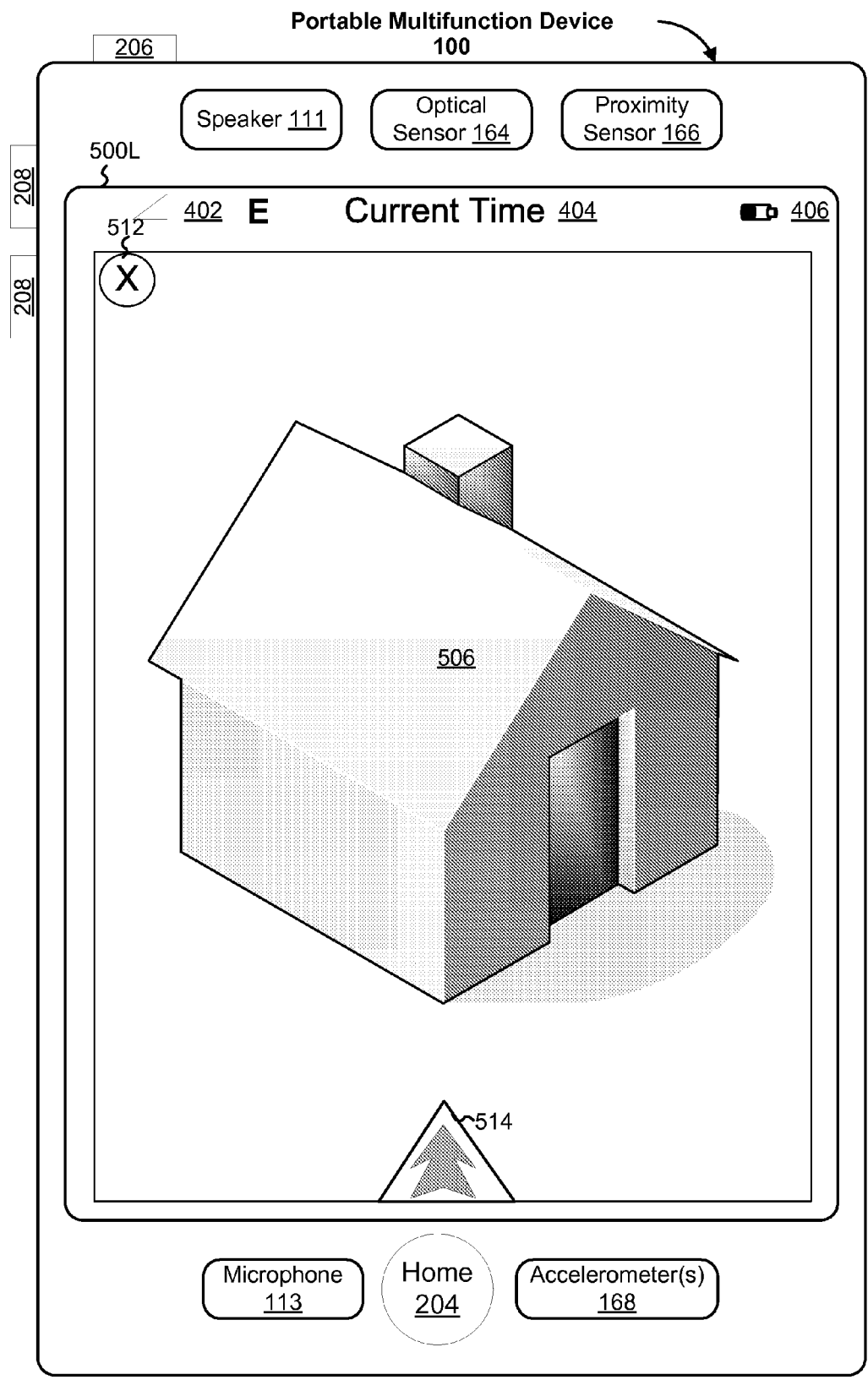
Figure 5M:
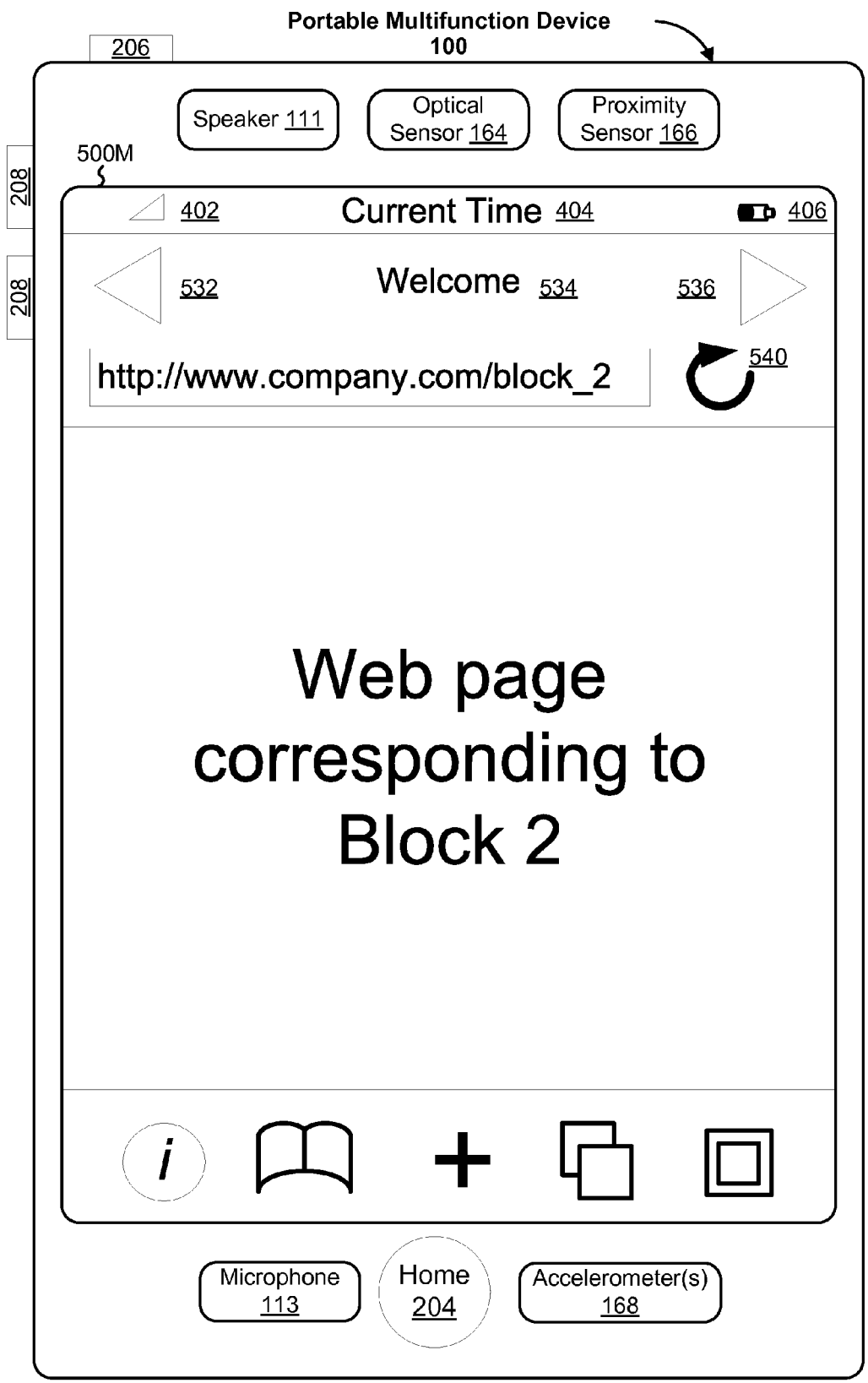

FIG. 5J depicts a user interface 500J corresponding to a browser application that includes multiple user selectable objects (e.g., blocks of content 544 that are introductions or summaries of corresponding web pages). In response to detecting a gesture (e.g., finger tap gesture 546) on a user selectable object 544-2, the device displays a user interface 500K (FIG. 5K) that has a full view of a second application 548 at a reduced scale. In this example, detecting a finger tap 552 on the view icon 550-1 or a finger tap 554 on the application itself will animatedly enlarge the second application (e.g., an advertising application) from this reduced scale to a full scale, as shown in FIG. 5L. Conversely, in response to detecting a finger tap 556 on the skip icon 550-2, the device ceases to display the second application and displays the web page that corresponds to object 544-2, as shown in FIG. 5M.

Figure 6A:
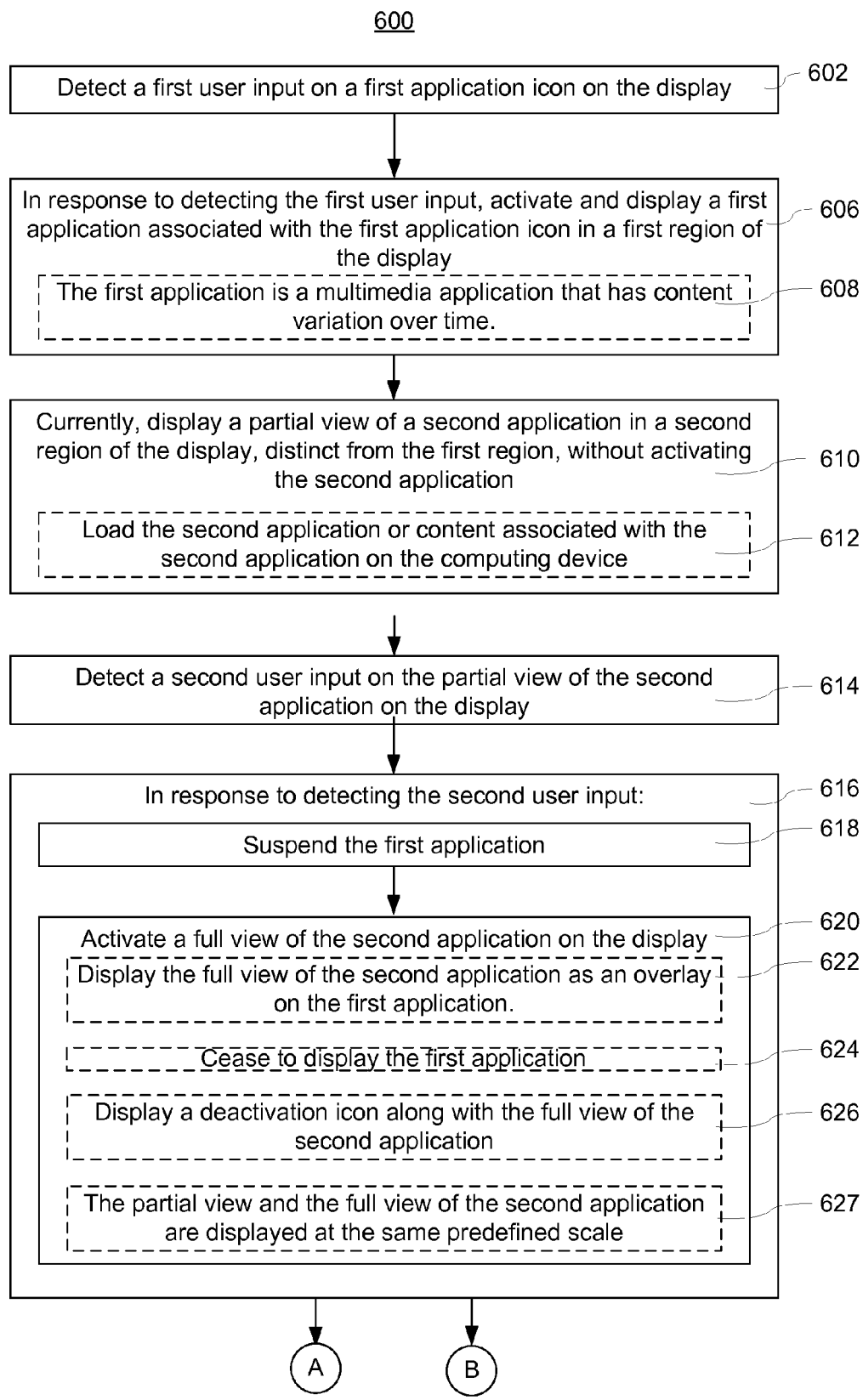
FIGS. 6A-6C are flow diagrams illustrating a method of navigating between applications in accordance with some embodiments.
Figure 6B:
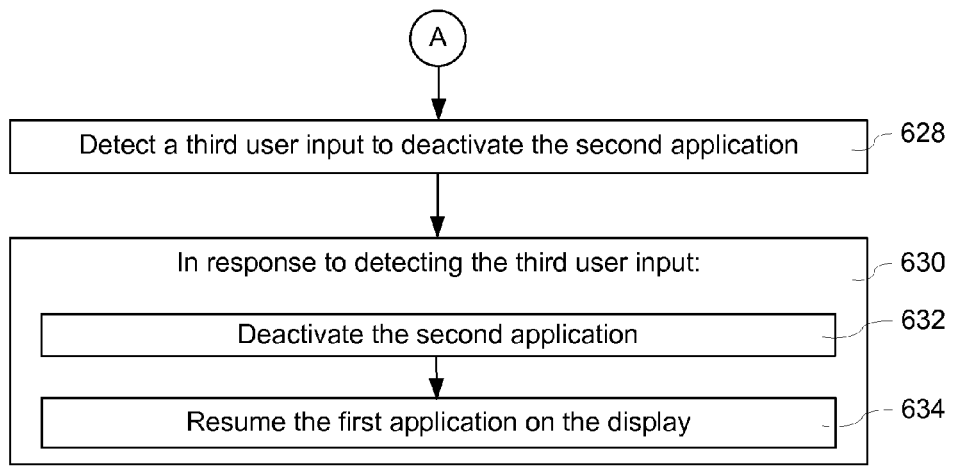
Figure 6C:
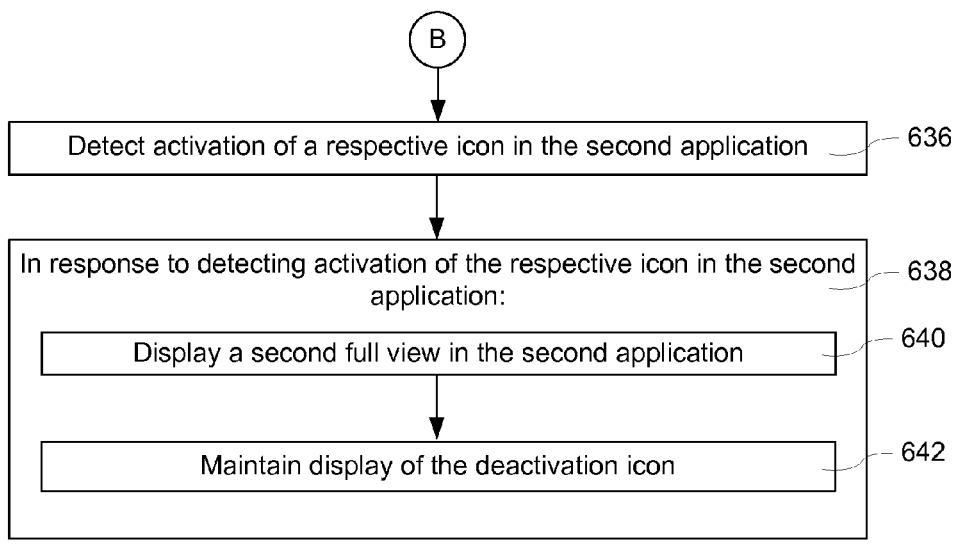

FIGS. 6A-6C are flow diagrams illustrating a method 600 of navigating between applications in accordance with some embodiments. The method 600 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to navigate back and forth between applications. The method reduces the cognitive burden on a user when navigating between applications, thereby creating a more efficient human-machine interface. For battery-operated computing devices, enabling a user to navigate between applications faster and more efficiently conserves power and increases the time between battery charges.

The device has a graphical user interface (500A, FIG. 5A) including a plurality of application icons such as the online video application icon 155 and the browser application icon 147, each icon corresponding to a respective application. In some embodiments, an application is responsible for rendering a respective type of content on the touch screen display. For example, the mail application is responsible for displaying emails on the touch screen display and the browser application is responsible for displaying web pages on the display.

The device detects (602) a first user input on a first application icon on the display. In response to detecting the first user input, the device activates and displays a first application associated with the first application icon in a first region of the display (606).

The device concurrently displays (610) a partial view of a second application in a second region of the display without activating the second application. In some embodiments, the partial view of the second application is displayed in the second region of the display in response to detecting the first user input. The second region is distinct from the first region. In some embodiments, the concurrent display of the partial view of the second application with the first application is in response to detecting the first user input. In some embodiments, the first application is a multimedia application (608) that has content that varies with time, such as a music player, a video player, a game player, etc.

For example, as shown in FIGS. 5A and 5B, in response to a finger tap 502 on the online video application icon 155, the device replaces the user interface 500A with the user interface 500B. One region of the user interface 500B corresponds to a first application 504 and another region of the user interface 500B corresponds to a partial view of a second application 506. In this example, the first application is a video player that is activated to play a video stream in the top region of the graphical user interface 500B. It is assumed that the user's primary focus is the first application when he or she activates the first application icon. The second application 506 is not activated until a corresponding user-selectable object is selected. Note that an activated application is an application in an operating mode (e.g., playing an audio or video stream). A deactivated application is one that has been closed or terminated, and thus is no longer operating.

Note that the second application 506 may include a unique style indicator 508, suggesting that the content associated with the second application is provided by a particular source or of a particular type. In some embodiments, the second application 506 is an advertisement application and the style indicator 508 may represent a particular brand, style or type of advertisement.

In some embodiments, the device loads (612) the second application or the content associated with the second application into its memory 102 before any subsequent input (e.g., the finger tap 510 on the second application 506 in FIG. 5B). By doing so, the device has at least a portion of the content associated with the second application available to serve the user before a possible user selection of the second application 506 in the future. Thus, the device provides faster or even instantaneous service in response to detecting activation of the second application 506.

The device detects (614) a second user input on the partial view of the second application on the display. In response to the second input (616), the device suspends the first application (618) and activates a full view of the second application on the display (620). In some embodiments, the two operations may occur sequentially in any order or concurrently. For example, as shown in FIGS. 5B-5D, in response to the finger tap 510 on the second application 506 in FIG. 5B, the device animatedly expands the second application 506 into a full view.

In some embodiments, responding to detection of the second user input includes displaying the full view of the second application as an overlay on the first application (622). In some embodiments, responding to detection of the second user input includes ceasing to display the first application (624), as shown in FIG. 5D. Referring to FIGS. 5C-5D, in response to finger tap 510 (FIG. 5B), the device immediately pauses or suspends the video player. While the second application 506 is expanding to full view, the device may animatedly dim out the first application 504 from the display to indicate that the second application 506 is being activated and the first application 504 is temporarily suspended.

In some embodiments, responding to detection of the second user input includes displaying (626) a deactivation icon along with the full view of the second application. Selection of the deactivation icon initiates deactivating the second application and resuming the first application. For example, FIG. 5D depicts a full view of the second application 506 that includes a deactivation icon 512.

In some embodiments, the partial view of the second application is displayed at a predefined scale and the full view of the second application is also displayed at the predefined scale (627). In some embodiments, the objects in the partial view (see, e.g., FIG. 5B) and their counterparts in the full view (see, e.g., FIG. 5D) have the same predefined scale such that an animated process of expanding the partial view into the full view as shown in FIG. 5C dynamically unveils the second application. This process may occur vertically and/or horizontally or in any direction or manner.

The device detects a third user input (e.g., a finger tap 516 on the deactivation icon 512) to deactivate the second application (628, FIG. 6B). In response to the third user input (630), the device deactivates the second application (632) and resumes the first application on the display (634).

For example, as shown in FIG. 5E, in response to a user selection of the deactivation icon 512, the device resumes the video play of the first application 504 from the position at which it was suspended previously. In some embodiments, detecting user selection of the deactivation icon 512 terminates one instance of the second application 506 and initiates a new partial view of the same second application 506. In some embodiments, detecting user selection of the deactivation icon 512 terminates the second application 506 and initiates a new partial view in a different application 507 (FIG. 5E). As such, detecting a finger tapping of the new partial view may activate a new instance of the second application 506 with different contents (e.g., a different advertisement) or a different application 507. In some other embodiments (not shown in the figures), the user selection of the deactivation icon 512 terminates the second application 506 completely and the second region of the display occupied by the partial view of the second application 506 may be empty or occupied by the first application 504.

In some embodiments, the full view of the second application 506 includes a services icon (see, e.g., 514 of FIG. 5D). Detecting user selection of the services icon 514 (e.g., a finger tap) brings up a set of icons, each icon corresponding to a respective service offered by the second application 506. For example, if the second application 506 is a movie promotion application, FIG. 5F depicts a set of six icons 518A to 518F, each icon corresponding to a respective service associated with the movie promotion. Note that a respective icon 518 may correspond to another view in the second application. Alternatively, a respective icon 518 may correspond to a third application, distinct from the second application, that is linked to or otherwise associated with the second application. For the discussion of method 600, icons 518 will be treated as links to respective additional views within the second application. For the discussion of method 700, icons 518 will be treated as links to respective third applications.

In some embodiments, upon detecting activation of a respective icon in the second application (636, 638), the device displays a second full view in the second application (640) to provide the user-requested service while maintaining the display of the deactivation icon (642). For example, FIG. 5G depicts a second full view in the second application displayed in response to detecting a user finger-tap 520A on the video icon 518A in FIG. 5F. In this example, a second full view in the second application that plays videos related to the movie promotion is activated in the graphical user interface 500G. Note that the graphical user interface 500G includes a back icon 522 and the deactivation icon 512. A finger tap 524 on the back icon 522 brings back the graphical user interface 500B (FIG. 5B) or the graphical user interface 500F (FIG. 5F). FIG. 5H depicts a second full view in the second application displayed in response to detecting a user finger-tap 520B on the theaters icon 518E in FIG. 5F. In this example, the second full view in the second application is a map application that identifies a theater location for the corresponding movie and includes a ticket purchase icon 526. In response to a user selection of this ticket purchase icon 526, the device may bring up a third full view in the second application through which a user can purchase a ticket to the movie at the identified theater. FIG. 5I depicts a second full view in the second application displayed in response to detecting a user finger-tap 520C on the downloads icon 518F in FIG. 5F. In this example, the second full view in the second application is a digital content purchase application that identifies, e.g., a song of the movie. In response to a user selection of the buy icon 528 associated with the song, the device may bring up a third full view in the second application through which a user can purchase an electronic copy of the song. Like the graphical user interface 500G in FIG. 5G, the user interface 500H and the user interface 500I each include a back icon 522 and the deactivation icon 512. In either case, detecting user selection of the back icon 522 brings back the previous full view of the second application 506 (e.g., FIG. 5D or 5F), whereas detecting user selection of the deactivation icon 512 brings back the first application (e.g., as shown in FIG. 5B or 5E). In some embodiments, the second full view of the second application provides access to a complete version of the second application (e.g., a premium version) whereas the first full view of the second application (FIG. 5D) only provides an introductory version (e.g., a lite or free version) of the second application. In some embodiments, the second full view of the second application is only accessible to a selected group of users (e.g., users who authorize charges against their bank accounts or credit cards for those premium services, or who are registered users of a service), while other users receive a restricted view of the second application instead of the second full view.

In some embodiments, the display of the deactivation icon 512 is maintained while any full view of the second application is displayed, thereby allowing a user to easily deactivate the second application 506 and return to the first application 504 from any point within the second application 506. In some embodiments, the deactivation icon 512 is maintained at the same location on the display in different full views in the second application 506 (e.g., an "X" icon at the upper left corner of a full view as shown in FIGS. 5D, 5F and 5H).

In some embodiments, the display of the deactivation icon 512 is maintained in different full views in the second application, but the location of the deactivation icon is not the same in all of the full views in the second application. In some embodiments, a "back" icon (e.g., icon 522, FIGS. 5G and 5I), which is separate and distinct from the deactivation icon (e.g., icon 512, FIGS. 5G and 5I), is concurrently displayed with the deactivation icon, thereby allowing a user to easily navigate backwards in the second application.

Note that details of the processes described above with respect to method 600 are also applicable in an analogous manner to the methods described below, including methods 700, 800, and 900. For brevity, these details are not repeated below.

Figure 7A:
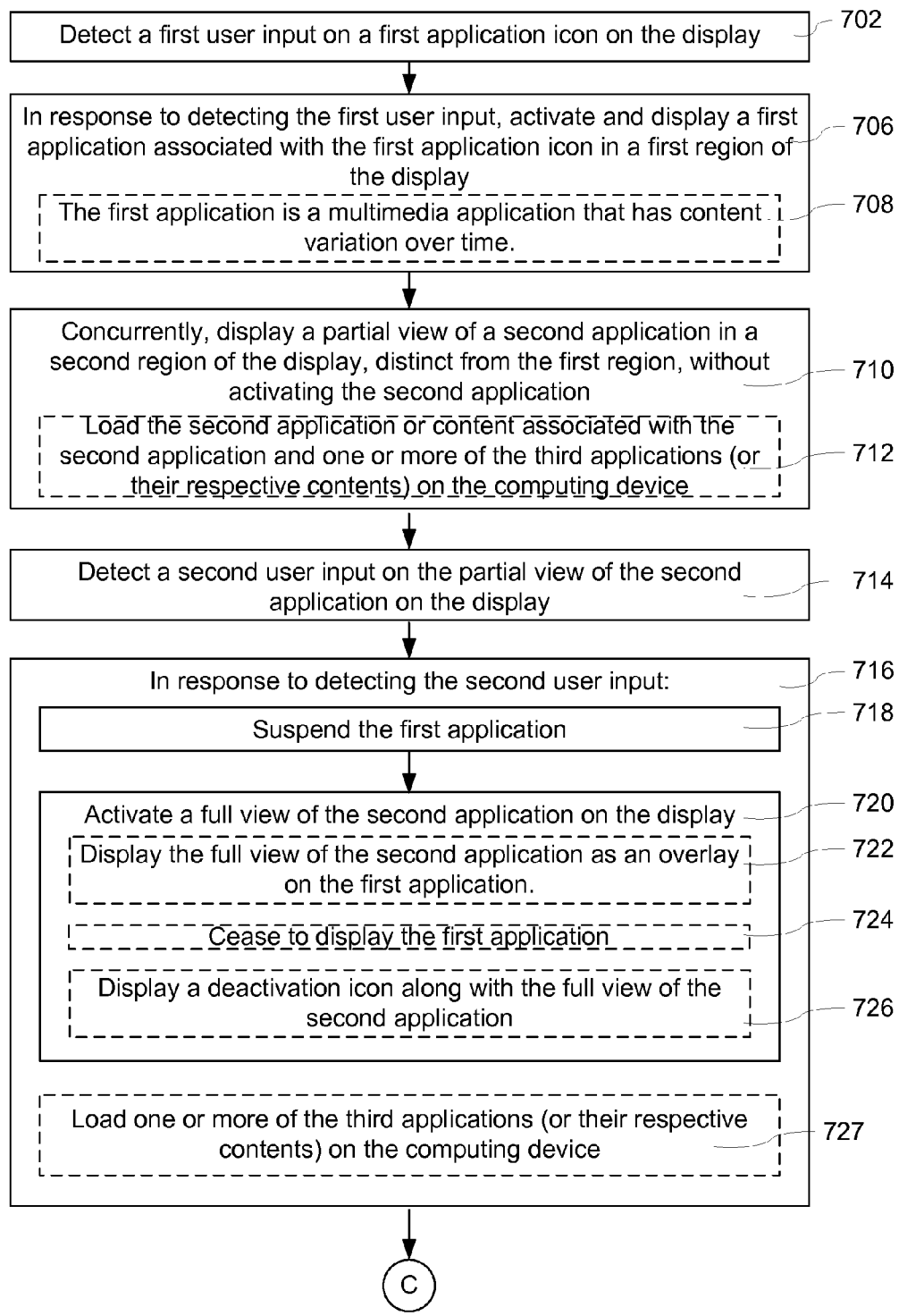
FIGS. 7A-7B are flow diagrams illustrating a method of navigating between applications in accordance with some embodiments.
Figure 7B:
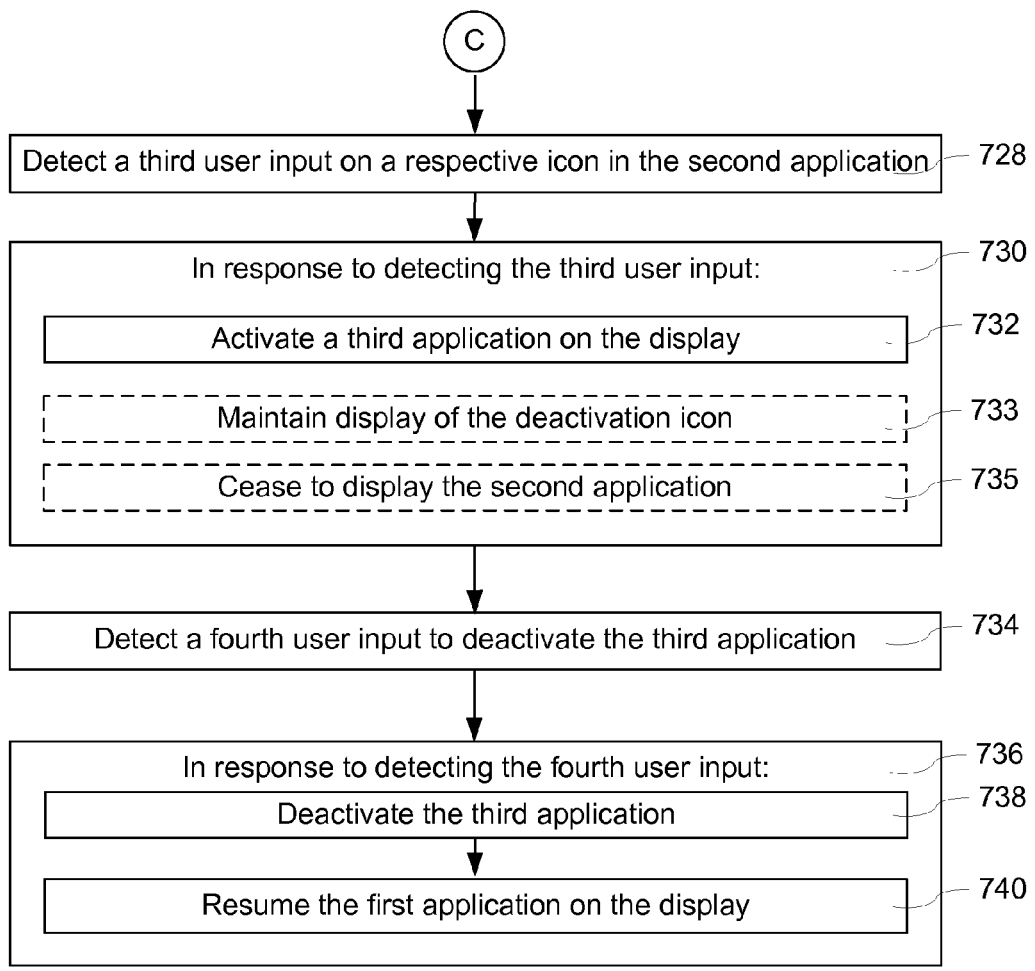

FIGS. 7A-7B are flow diagrams illustrating a method 700 of navigating between applications in accordance with some embodiments. The method 700 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides an intuitive way to navigate between applications. The method reduces the cognitive burden on a user when navigating between applications, thereby creating a more efficient human-machine interface. For battery-operated computing devices, enabling a user to navigate between applications faster and more efficiently conserves power and increases the time between battery charges.

The device detects (702) a first user input on a first application icon on the display. In response to detecting the first user input, the device activates and displays a first application associated with the first application icon in a first region of the display (706).

The device concurrently displays a partial view of a second application in a second region of the display without activating the second application (710). In some embodiments, the partial view of the second application is displayed in the second region of the display in response to detecting the first user input. The second region is distinct from the first region. In some embodiments, the concurrent display of the partial view of the second application with the first application is in response to detecting the first user input. In some embodiments, the first application is a multimedia application (708) that has content that varies with time, such as a music player, a video player, a game player, etc.

In some embodiments, besides the aforementioned operations triggered by the first user input, the device loads (712) the second application or the content associated with the second application and one or more of the third applications associated with the second application (or their respective contents) into its memory 102 before any subsequent input. By doing so, the device has at least a portion of the content associated with the second application available to serve the user before a possible user selection of the second application 506 in the future. Thus, the device provides faster or even instantaneous service in response to detecting activation of the second application 506.

The device detects (714) a second user input on the partial view of the second application on the display. In response to the second input (716), the device suspends the first application (718) and activates a full view of the second application on the display (720). In some embodiments, the two operations may occur sequentially in any order or concurrently. For example, as shown in FIGS. 5C-5D, in response to the finger tap 510 on the second application 506 in FIG. 5B, the device animatedly expands the second application 506 into a full view.

In some embodiments, responding to detection of the second user input includes displaying the full view of the second application as an overlay on the first application (722). In some embodiments, responding to detection of the second user input includes ceasing to display the first application (724), as shown in FIG. 5D. Referring to FIGS. 5C-5D, in response to finger tap 510 (FIG. 5B), the device immediately pauses or suspends the video player. While the second application 506 is expanding to full view, the device may animatedly dim out the first application 504 from the display to indicate that the second application 506 is being activated and the first application 504 is temporarily suspended.

In some embodiments, responding to detection of the second user input includes displaying (726) a deactivation icon along with the full view of the second application. Selection of the deactivation icon initiates deactivating the second application and resuming the first application. For example, FIG. 5D depicts a full view of the second application 506 that includes a deactivation icon 512.

In some embodiments, the partial view of the second application is displayed at a predefined scale and the full view of the second application is also displayed at the predefined scale. In some embodiments, the objects in the partial view (see, e.g., FIG. 5B) and their counterparts in the full view (see, e.g., FIG. 5D) have the same predefined scale such that an animated process of expanding the partial view into the full view as shown in FIG. 5C dynamically unveils the second application. This process may occur vertically and/or horizontally or in any direction or manner.

The device detects a third user input on a respective icon in the second application (e.g., any one of the six icons 518A to 518F) (728, FIG. 7B). In response to detecting the third user input (730), the device activates a third application on the display (732). Exemplary third applications include a video player application, a map application, and a digital content store (FIGS. 5G-5I). In some embodiments, the second application provides access to a preview of a full version of digital content (such as songs, movies, applications, books, and/or games), while the third application is an application related to the second application and allows a user to download a full version of the digital content from a remote source. For example, the third application may be an online commerce application such as an online application store (e.g., Apple's application store), an online digital content store (e.g., iTunes or iBooks), or an application that provides service related to the second application (e.g., the map application shown in FIG. 5H). In some embodiments, the device maintains (733) display of the deactivation icon on the third application (see, e.g., the deactivation icon 512 in FIGS. 5G to 5I). In some embodiments, the device ceases (735) to display the second application after the activation of the third application. For example, one of the third applications shown in FIGS. 5G to 5I does not include any portion of the second application shown in FIG. 5F.

In some embodiments, the device loads (727) one or more of the third applications (or their respective contents) in response to detecting (716) the second user input prior to detecting (728) the third input.

In some embodiments, the applications are related to one another such that there are links between the first application and one or more second applications, and links between a respective second application and one or more associated third applications. The device maintains a hierarchical relationship between these links in its memory to activate an appropriate child application associated with a parent application according to the hierarchical relationship.

In some embodiments, the device detects a fourth user input to deactivate the third application (734). In response to the fourth user input (736), the device deactivates the third application (738) and resumes the first application on the display (740). As described above, this process allows a user to switch back to the root application from which any subsequent application is derived according to the hierarchical relationship. Instead of restarting itself from the beginning, the root application is configured to resume from the position at which it was suspended before. As such, this process allows a user to navigate into one sequence of applications while maintaining a shortcut for the user to return to the starting point of the navigation.

Figure 8:
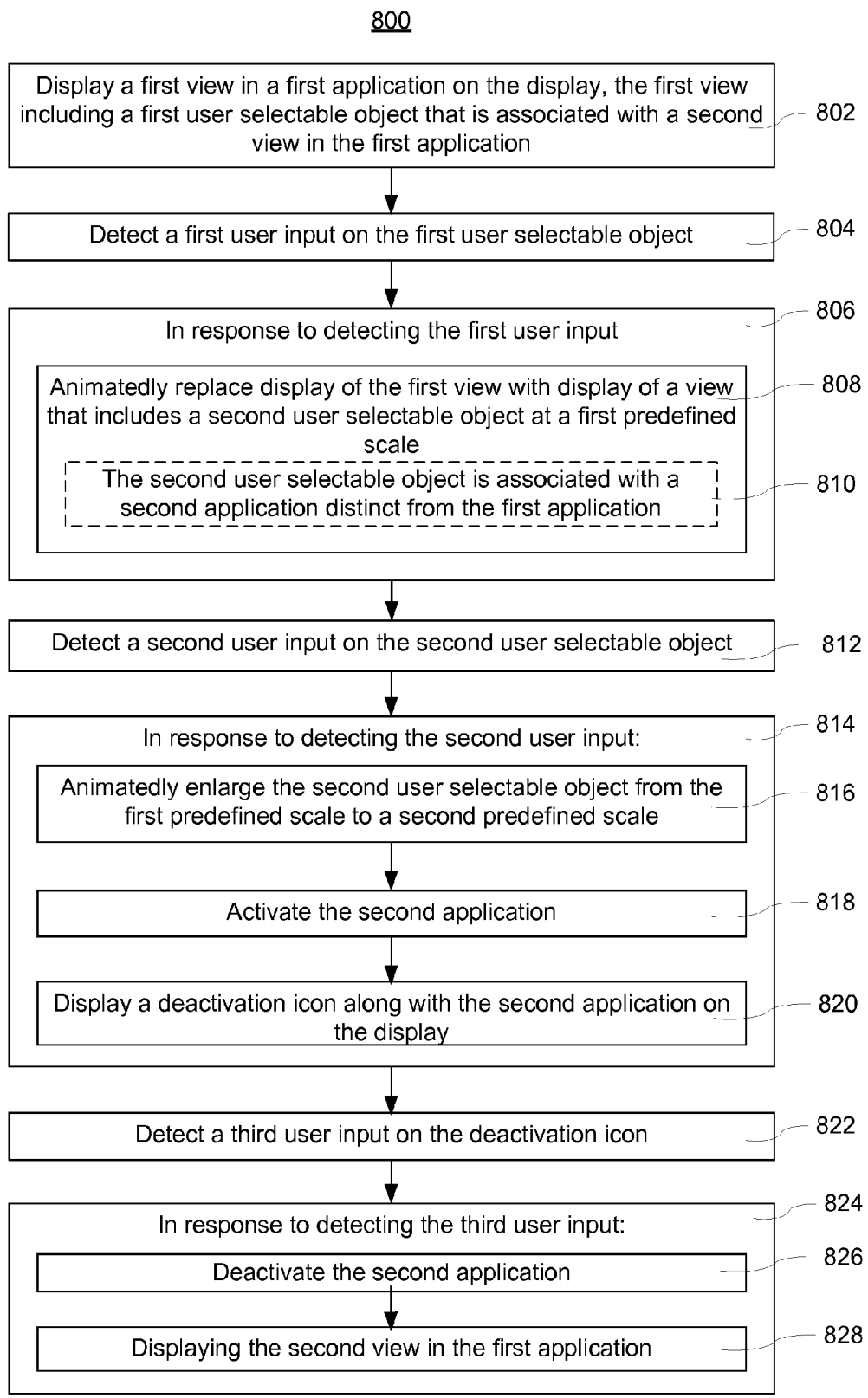
FIG. 8 is a flow diagram illustrating a method of navigating between applications in accordance with some embodiments.

FIG. 8 is a flow diagram illustrating a method 800 of navigating between applications. The method 800 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, the method 800 provides an intuitive way to navigate between applications. The method reduces the cognitive burden on a user when navigating between applications, thereby creating a more efficient human-machine interface. For battery-operated computing devices, enabling a user to navigate between applications faster and more efficiently conserves power and increases the time between battery charges.

The device displays (802) a first view in a first application on the display. The first view includes a first user selectable object that is associated with a second view in the first application. For example, FIG. 5J depicts a web browser application on the display. In this example, web page 542 includes multiple blocks of content 544-1 to 544-8. At least one of blocks has a link to another, corresponding web page that can be selected with a gesture (e.g., a finger tap).

The device detects a first user input on the first user selectable object (804). In response to the first user input (806), the device animatedly replaces display of the first view with display of a view that includes a second user selectable object at a first predefined scale (808). In some embodiments, the second user selectable object is associated with a second application distinct from the first application (810). For example, as shown in FIGS. 5J and 5K, respectively, in response to detecting a finger-tap 546 on block 544-2, the device replaces the browser view with a new view that includes a second user selectable object 548 at a first predefined scale. In addition, the new view includes a view icon 550-1 and a skip icon 550-2.

The device detects a second user input on the second user selectable object (812). In response to detecting the second user input (814), the device animatedly enlarges the second user selectable object from the first predefined scale to a second predefined scale (816) and activates the second application (818). In some embodiments, a deactivation icon is displayed along with the second application (820). For example, as shown in FIGS. 5K and 5L, in response to detecting user finger-tap 554 on the object 548 or user finger-tap 552 on the view icon 550-1, the device enlarges the full view of the second application from a first smaller scale (FIG. 5K) to a second larger scale (FIG. 5L). Note that a deactivation icon 512 is also displayed (e.g., at the top left corner of user interface 500L).

The device detects a third user input on the deactivation icon (822). In response to detecting the third user input (824), the device animatedly deactivates (e.g., dims out and ceases to display) the second application from the display (826) and displays a second view of the first application (828). As shown in FIG. 5M, the second view of the first application is a full view of the web page associated with block 544-2. Note that a user selection 556 (FIG. 5K) of the skip icon 550-2 will bypass the second application (e.g., FIG. 5L) and instead display the second view of the first application (e.g., FIG. 5M).

Figure 9:
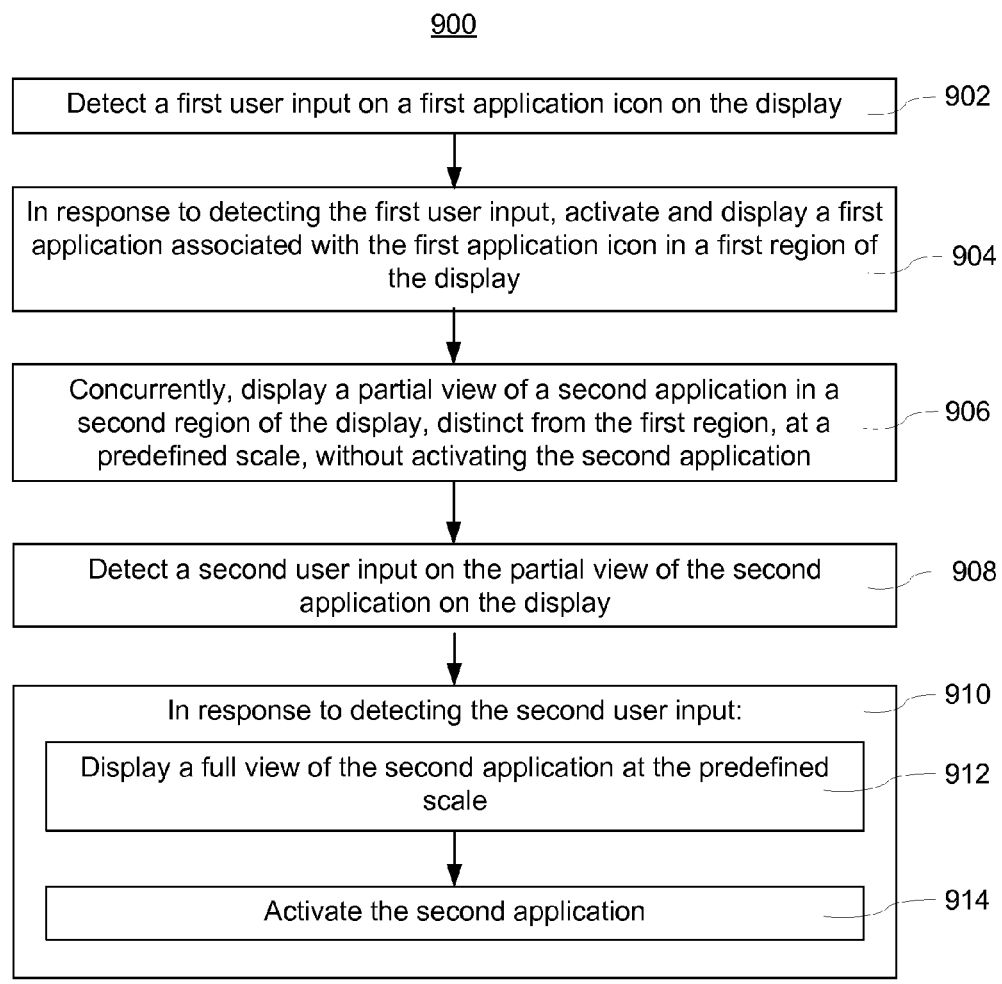
FIG. 9 is a flow diagram illustrating a method of navigating between applications in accordance with some embodiments.

FIG. 9 is a flow diagram illustrating a method 900 of navigating between applications in accordance with some embodiments. The method 900 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 900 may be combined and/or the order of some operations may be changed.

As described below, the method 900 provides an intuitive way to navigate between applications. The method reduces the cognitive burden on a user when navigating between applications, thereby creating a more efficient human-machine interface. For battery-operated computing devices, enabling a user to navigate between applications faster and more efficiently conserves power and increases the time between battery charges.

The device detects a first user input on a first application icon on the display (902). In response to detecting the first user input, the device activates and displays a first application associated with the first application icon in a first region of the display (904).

The device concurrently displays a partial view of a second application at a predefined scale in a second region of the display (906). In some embodiments, the partial view of the second application is displayed in the second region of the display in response to detecting the first user input. The second region is distinct from the first region and the second application is not activated.

The device detects a second user input on the partial view of the second application on the display (908). In response to detecting the second user input (910), the device displays a full view of the second application at the same predefined scale as the partial view (912) and activates the second application (914). As shown in FIGS. 5B-5D, respectively, the objects in different views of the second application 506 have the same scale. The objects in the partial view (see, e.g., FIG. 5B) and their counterparts in the full view (see, e.g., FIG. 5D) have the same predefined scale such that an animated process of expanding the partial view into the full view as shown in FIG. 5C dynamically unveils the second application. This unveiling at the same scale makes for a smoother transition into the second application. This process may occur vertically and/or horizontally or in any direction or manner.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The operations described above with reference to FIGS. 6A-6C, 7A-7B, 8 and 9 may be implemented by components depicted in FIGS. 1A-1C. For example, detection operations and activating/deactivating operations may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176, object updater 177 or GUI updater 178 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a computing device with a touch-sensitive display:
displaying a first view of a first application on the display, the first view including a first user selectable object that is associated with a second view of the first application;
detecting a first user input on the first user selectable object that is associated with the second view of the first application;
in response to detecting the first user input on the first user selectable object that is associated with the second view of the first application, animatedly replacing display of the first view of the first application with display of a view that includes a second user selectable object at a first predefined scale, the second user selectable object being for a second application that is distinct from the first application;
while displaying the view that includes the second user selectable object at the first predefined scale, detecting a second user input on the second user selectable object;
in response to detecting the second user input on the second user selectable object:
animatedly enlarging the second user selectable object from the first predefined scale to a second predefined scale;
activating the second application; and
displaying a termination icon with the second application on the display;
while displaying the termination icon with the second application on the display, detecting a third user input on the termination icon; and,
in response to detecting the third user input on the termination icon:
terminating the second application;
ceasing to display the second application; and
displaying the second view of the first application.

2. The method of claim 1, including loading the second application on the computing device prior to detecting the second input.

3. The method of claim 1, including loading content associated with the second application on the computing device prior to detecting the second input.

4. The method of claim 1, wherein responding to detection of the second user input includes displaying the full view of the second application as an overlay on the first application.

5. The method of claim 1, wherein responding to detection of the second user input includes ceasing to display the first application.

6. A portable multifunction device, comprising:
a touch-sensitive display;
one or more processors;
memory; and
one or more programs, wherein the one or more programs are stored in the memory and configured to be executed by the one or more processors, the one or more programs including instructions for:
displaying a first view of a first application on the display, the first view including a first user selectable object that is associated with a second view of the first application;
detecting a first user input on the first user selectable object that is associated with the second view of the first application;
in response to detecting the first user input on the first user selectable object that is associated with the second view of the first application, animatedly replacing display of the first view of the first application with display of a view that includes a second user selectable object at a first predefined scale, the second user selectable object being for a second application that is distinct from the first application;
while displaying the view that includes the second user selectable object at the first predefined scale, detecting a second user input on the second user selectable object;
in response to detecting the second user input on the second user selectable object:
animatedly enlarging the second user selectable object from the first predefined scale to a second predefined scale;
activating the second application; and
displaying a termination icon with the second application on the display;
while displaying the termination icon with the second application on the display, detecting a third user input on the termination icon; and,
in response to detecting the third user input on the termination icon:
terminating the second application;
ceasing to display the second application; and
displaying the second view of the first application.

7. A graphical user interface on a portable multifunction device with a touch-sensitive display, memory, and one or more processors to execute one or more programs stored in the memory, the graphical user interface comprising:
a first view of a first application on the display, the first view including a first user selectable object that is associated with a second view of the first application;
wherein:
a first user input on the first user selectable object that is associated with the second view of the first application is detected;
in response to detecting the first user input on the first user selectable object that is associated with the second view of the first application, the display of the first view of the first application is animatedly replaced with display of a view that includes a second user selectable object at a first predefined scale, the second user selectable object being for a second application that is distinct from the first application;
while displaying the view that includes the second user selectable object at the first predefined scale, a second user input on the second user selectable object is detected;
in response to detecting the second user input on the second user selectable object:
the second user selectable object is animatedly enlarged from the first predefined scale to a second predefined scale;
the second application is activated; and
a termination icon is displayed with the second application on the display;

while displaying the termination icon with the second application on the display, a third user input on the termination icon is detected; and,
in response to detecting the third user input on the termination icon:
the second application is terminated;
ceasing to display the second application; and
the second view of the first application is displayed.

8. A non-transitory computer readable storage medium storing one or more programs, the one or more programs comprising instructions, which when executed by a portable multifunction device with a touch-sensitive display, cause the device to:
display a first view of a first application on the display, the first view including a first user selectable object that is associated with a second view of the first application;
detect a first user input on the first user selectable object that is associated with the second view of the first application;
in response to detecting the first user input on the first user selectable object that is associated with the second view of the first application, animatedly replace display of the first view of the first application with display of a view that includes a second user selectable object at a first predefined scale, the second user selectable object being for a second application that is distinct from the first application;
while displaying the view that includes the second user selectable object at the first predefined scale, detect a second user input on the second user selectable object;
in response to detecting the second user input on the second user selectable object:
animatedly enlarge the second user selectable object from the first predefined scale to a second predefined scale;
activate the second application; and
display a termination icon with the second application on the display;
while displaying the termination icon with the second application on the display, detect a third user input on the termination icon; and,
in response to detecting the third user input on the termination icon:
terminate the second application;
cease to display the second application; and
display the second view of the first application.

9. A portable multifunction device, comprising:
a touch-sensitive display;
means for displaying a first view of a first application on the display, the first view including a first user selectable object that is associated with a second view of the first application;
means for detecting a first user input on the first user selectable object that is associated with the second view of the first application;
in response to detecting the first user input on the first user selectable object that is associated with the second view of the first application, means for animatedly replacing display of the first view of the first application with display of a view that includes a second user selectable object at a first predefined scale, the second user selectable object being for a second application that is distinct from the first application;
while displaying the view that includes the second user selectable object at the first predefined scale, means for detecting a second user input on the second user selectable object;
in response to detecting the second user input on the second user selectable object:
means for animatedly enlarging the second user selectable object from the first predefined scale to a second predefined scale;
means for activating the second application; and
means for displaying a termination icon with the second application on the display;
while displaying the termination icon with the second application on the display, means for detecting a third user input on the termination icon; and,
in response to detecting the third user input on the termination icon:
means for terminating the second application;
means for ceasing to display the second application; and
means for displaying the second view of the first application.

10. An information processing apparatus for use in a portable multifunction device with a touch-sensitive display, comprising:
means for displaying a first view of a first application on the display, the first view including a first user selectable object that is associated with a second view of the first application;
means for detecting a first user input on the first user selectable object that is associated with the second view of the first application;
in response to detecting the first user input on the first user selectable object that is associated with the second view of the first application, means for animatedly replacing display of the first view of the first application with display of a view that includes a second user selectable object at a first predefined scale, the second user selectable object being for a second application that is distinct from the first application;
while displaying the view that includes the second user selectable object at the first predefined scale, means for detecting a second user input on the second user selectable object;
in response to detecting the second user input on the second user selectable object:
means for animatedly enlarging the second user selectable object from the first predefined scale to a second predefined scale;
means for activating the second application; and
means for displaying a termination icon with the second application on the display;
while displaying the termination icon with the second application on the display, means for detecting a third user input on the termination icon; and,
in response to detecting the third user input on the termination icon:
means for terminating the second application;
means for ceasing to display the second application; and
means for displaying the second view of the first application.

11. The device of claim 6, including instructions for loading the second application on the computing device prior to detecting the second input.

12. The device of claim 6, including instructions for loading content associated with the second application on the computing device prior to detecting the second input.

13. The device of claim 6, wherein responding to detection of the second user input includes displaying the full view of the second application as an overlay on the first application.

14. The device of claim 6, wherein responding to detection of the second user input includes ceasing to display the first application.

15. The non-transitory computer readable storage medium of claim 8, including instructions that cause the device to load the second application on the computing device prior to detecting the second input.

16. The non-transitory computer readable storage medium of claim 8, including instructions that cause the device to load content associated with the second application on the computing device prior to detecting the second input.

17. The non-transitory computer readable storage medium of claim 8, wherein responding to detection of the second user input includes displaying the full view of the second application as an overlay on the first application.

18. The non-transitory computer readable storage medium of claim 8, wherein responding to detection of the second user input includes ceasing to display the first application.

* * * * *

UNITED STATES PATENT AND TRADEMARK OFFICE
CERTIFICATE OF CORRECTION

| | | |
|---|---|---|
| PATENT NO. | : 9,146,751 B2 | Page 1 of 1 |
| APPLICATION NO. | : 12/890489 | |
| DATED | : September 29, 2015 | |
| INVENTOR(S) | : Freddy Allen Anzures et al. | |

It is certified that error appears in the above-identified patent and that said Letters Patent is hereby corrected as shown below:

Title Page, item (56)

On the page 2, in column 1, under "Other Publications", line 22, delete "Woodman," and insert -- Woortman, --.

On the page 2, in column 2, under "Other Publications", line 42, delete "reeceived" and insert -- received --.

Signed and Sealed this
Tenth Day of May, 2016

Michelle K. Lee
*Director of the United States Patent and Trademark Office*